(12) United States Patent
Tsurumoto et al.

(10) Patent No.: US 9,007,187 B2
(45) Date of Patent: Apr. 14, 2015

(54) COMMUNICATION SYSTEM AND COMMUNICATION DEVICE

(75) Inventors: Takashi Tsurumoto, Saitama (JP); Yoshinori Satoh, Saitama (JP)

(73) Assignee: Sony Corporation (JP)

( * ) Notice: Subject to any disclaimer, the term of this patent is extended or adjusted under 35 U.S.C. 154(b) by 1007 days.

(21) Appl. No.: 13/066,139

(22) Filed: Apr. 7, 2011

(65) Prior Publication Data

US 2011/0254723 A1  Oct. 20, 2011

(30) Foreign Application Priority Data

Apr. 16, 2010  (JP) ................ P2010-095400

(51) Int. Cl.
| | |
|---|---|
| *H04N 5/44* | (2011.01) |
| *G08C 17/00* | (2006.01) |
| *G08C 17/02* | (2006.01) |
| *H04N 21/422* | (2011.01) |

(52) U.S. Cl.
CPC ............ *G08C 17/00* (2013.01); *G08C 2201/93* (2013.01); *H04N 21/42207* (2013.01); *H04N 21/42222* (2013.01); *G08C 2201/51* (2013.01); *G08C 17/02* (2013.01); *G08C 2201/12* (2013.01); *G08C 2201/50* (2013.01)

(58) Field of Classification Search
CPC .... G08C 23/00; G08C 23/04; G08C 2201/50; G08C 2201/51; G08C 2201/31; G08C 2201/93; G08C 2201/12; H04N 5/4403; H04N 21/4126; H04N 21/42207; H04N 21/42221; H04N 21/42222; H04N 21/4221

USPC ........ 340/12.22; 398/106, 107, 120; 348/734; 341/173, 176
See application file for complete search history.

(56) References Cited

U.S. PATENT DOCUMENTS 6,243,022 B1 *  6/2001  Furukawa .................. 340/13.31
2005/0166222 A1 *  7/2005  Tully, Jr. et al. ................. 725/33

FOREIGN PATENT DOCUMENTS

| | | | |
|---|---|---|---|
| JP | 2001-111647 A | | 4/2001 |
| JP | 2001111647 A | * | 4/2001 |

* cited by examiner

*Primary Examiner* — Daniell L Negron
*Assistant Examiner* — Benyam Haile
(74) *Attorney, Agent, or Firm* — Lerner, David, Littenberg, Krumholz & Mentlik, LLP

(57) ABSTRACT

A communication system includes: a remote controller having an input unit inputting user operations and a communication unit performing bidirectional communication, transmitting a remote control code in accordance with the user operation with respect to the input unit from the communication unit; and a host device having a communication unit performing bidirectional communication and a host function unit executing processing corresponding to the remote control code received in the communication unit, wherein the host device transmits a status response from the communication unit in response to a status inquiry transmitted from the communication unit of the remote controller, the remote controller repeatedly executes a status check communication procedure including the transmission of the status inquiry and waiting for receiving the status response after transmitting the remote control code at given time intervals during which the communication unit is in a dormant state.

8 Claims, 15 Drawing Sheets

COMMUNICATION SYSTEM AND COMMUNICATION DEVICE

CROSS-REFERENCE TO RELATED APPLICATION

The present application claims priority from Japanese Patent Application No. JP 2010-095400 filed in the Japanese Patent Office on Apr. 16, 2010, the entire content of which is incorporated herein by reference.

BACKGROUND OF THE INVENTION

1. Field of the Invention

The present invention relates to a communication system and a communication device including a remote controller performing remote control by transmitting remote control codes and a host device to be an operation target by the remote control codes, and particularly relates to a communication system and a communication device performing bidirectional communication between the remote controller and the host device by using a wireless network.

2. Description of the Related Art

Presently, remote control is widely applied in various information devices such as a television receiver and AV devices. In the present specification, a device body to be the operation target for the remote controller is generically referred to as a "host device".

As a communication means for the remote controller, infrared communication has been used. The infrared communication has advantages such that it is inexpensive and that power consumption is low, however, the infrared communication has disadvantages such that it is limited to unidirectional communication and that there is directivity. On the other hand, when using a wireless network is used as the communication means, bidirectional communication can be performed between the remote controller and the host device and the communication range is expanded, however, there exists a problem that the power consumption is high. Hereinafter, a remote control system using the wireless network will be considered.

Many host devices such as the television receiver use a commercial AC power supply as a main power supply, which are capable of receiving wireless signals from the remote controller by allowing the devices to be constantly in a reception waiting state. On the other hand, the load for a battery will be excessive when applying the constant reception waiting state for the remote controller side which is driven by the battery. However, when the reception waiting state is intermittent in the remote controller for saving power consumption, it is not easy to perform information transmission to the remote controller triggered by the host device side.

Here, current consumption in a case of applying IEEE802.15.4 as the wireless network used when performing bidirectional communication between the remote controller and the host device will be explained as an example.

Electric current of approximately 30 mA (a general value in DC 3.0V) flows through a communication module of IEEE802.15.4 a general value in DC 3.0V in any of transmission, reception and the reception waiting state. When the remote controller is constantly in the reception waiting state, electric current of 30 mA constantly flows. When the capacity of an AA battery is 750 mAh, a battery lifetime in the constant reception waiting state of the remote controller is 750 mAh/30 mA=25 hours, namely, just one day.

On the other hand, when the remote controller is in a dormant state in which transmission/receiving operations are not performed, which realizes little power consumption. The remote controller with little battery consumption can be obtained by allowing the remote controller to be in the dormant state in all periods except periods when remote control codes are transmitted. When the remote controller transmits a remote control code, the code has several bytes. As a communication rate of IEEE802.15.4 is 250 kbps, a communication sequence including an acknowledgment (ACK) is completed for approximately one millisecond even when information necessary for communication such as a header is added. That is, electric current and time necessary for one transmission by the remote controller is 30 mA, 1 millisecond. When the capacity of an AA battery is 750 mAh, the number of times the remote controller can be operated is 750 mAh×60×60 seconds/0.001 seconds/30 mA=90,000,000 times. Assuming that the remote control is performed 1000 times in a day, it is possible to use the remote controller 90,000 days, which is a considerably long life. However, when the reception waiting state is intermittent in the remote controller, it is not easy to perform information transmission to the remote controller triggered by the host device side (as described above).

A user selects a menu item on a screen of the host device, for example, by using cursor buttons of the remote controller and presses a determination button to thereby fix the selection of the menu item. On the host device side, an application corresponding to the selected menu item is activated, then, the application generates transmission information to the remote controller. In this case, the user himself/herself operating the remote controller while watching the screen realizes that there is transmission of information triggered by the host device through the operation of the remote controller. However, it is difficult that the remote controller itself recognizes that there is processing executed on the host device side or transmission of information triggered by the host device side only through the operations such that the cursor buttons and the determination button are pressed.

Some methods may be cited for allowing the remote controller in the dormant state to receive transmission information triggered by the host device.

For example, an activation button is provided at the remote controller. When the host device desires to transmit information to the remote controller, a screen for promoting the user to press the activation button is displayed. When the user presses the activation button of the remote controller in accordance with the instruction of the screen, the remote controller is switched from the dormant state to the reception waiting state and can receive transmission information from the host device. After the communication ends, the remote controller becomes in the dormant state again.

However, in the method using the activation button, it is necessary that the screen display for promoting the user to press the activation button is performed on the host device side. The trouble of operating the activation button is given to the user, and it is forced to press the activation button regardless of intention of the user every time information is transmitted from the host device. The processing is stopped from the start of information transmission by the host device until the user presses the activation button.

When information transmission triggered by the host device side is performed, button operations of the remote controller are performed until reaching the information transmission in many cases. For example, the case in which the menu item on the screen of the host device is selected by using the cursor buttons of the remote controller and the determination button is further pressed to thereby fix the selection of the menu item corresponds to the case (as described above).

When focusing attention to the point, a method can be considered, that is, the remote controller is allowed to be in the reception waiting state during a certain period of time from the last time when the user pressed the button of the remote controller, and the reception operation is subsequently performed when information is transmitted from the host device during the period, however, the state is changed to the dormant state when there is no information transmission to thereby suppress power consumption. For example, a communication system capable of extending reception waiting time until a reception means is operated after the remote controller has transmitted a remote control signal is proposed (for example, refer to JP-A-2001-111647 (Patent Document 1).

However, power consumption of the remote controller is not low when the remote controller is shifted to the reception waiting state every time the button is operated. When the reception time is 1000 milliseconds, the operation time is drastically increased as compared with the time of 1 millisecond during which electric current is consumed by transmitting the remote control code, therefore, the battery lifetime is reduced by the increase.

The time from the pressing of the button on the remote controller side (namely, from the transmission of the remote control code) until information transmission is started on the host device side is not always fixed, therefore, it is difficult to set suitable reception waiting time of the remote controller. For example, when processing such as an inquiry to the network interrupts processing of the application activated in accordance with the operation of the remote controller by the host device, the reception waiting time is not only irregular but also extremely increased. When the reception waiting time is set to the maximum value assumed to be necessary by considering the above, power consumption by the reception waiting operation generated every time button operation of the remote controller is performed will be increased.

SUMMARY OF THE INVENTION

In view of the above, it is desirable to provide an excellent communication system and a communication device capable of performing bidirectional communication between a remote controller and a host device by using a wireless network.

It is also desirable to provide an excellent communication system and a communication device capable of performing bidirectional communication between devices using the wireless network, which can preferably transmit information to the remote controller by being triggered by the host device side while allowing the remote controller to be in a reception waiting state intermittently.

According to an embodiment of the invention, there is provided a communication system including a remote controller having an input unit inputting user operations and a communication unit performing bidirectional communication, transmitting a remote control code in accordance with the user operation with respect to the input unit from the communication unit, and a host device having a communication unit performing bidirectional communication and a host function unit executing processing corresponding to the remote control code received in the communication unit, in which the host device transmits a status response from the communication unit in response to a status inquiry transmitted from the communication unit of the remote controller, the remote controller repeatedly executes a status check communication procedure including the transmission of the status inquiry and waiting for receiving the status response after transmitting the remote control code at given time intervals during which the communication unit is in a dormant state.

"System" in this case indicates a state in which plural devices (or function modules realizing specific functions) are logically aggregated, and whether respective devices and function modules are in a single casing or not does not matter.

According to another embodiment of the invention, the above communication system may be configured such that the host device executes processing corresponding to the received remote control code and transmits the status response including transmission information with respect to the remote controller. The remote controller repeatedly executes the status check communication procedure until receiving the status response including transmission information.

According to still another embodiment of the invention, the above communication system may be configured such that the host device executes processing corresponding to the received remote control code and transmits the status response including information indicating whether there is transmission information with respect to the remote controller or not. The remote controller repeatedly executes the status check communication procedure until receiving transmission information indicated by the status response.

According to yet another embodiment of the invention, the above communication system may be configured such that the remote controller includes one or more function units. The host device transmits transmission information instructing activation of at least one function unit in the one or more function units, while the remote controller activates the function unit designated by the received transmission information.

According to still yet another embodiment of the invention, the above communication system may be configured such that the remote controller extends the time interval of status inquiries to be transmitted according to the number of transmission times.

According to further another embodiment of the invention, there is provided a communication device including an input unit inputting user operations, a communication unit performing bidirectional communication and a control unit controlling operations of the device, which is operated as a remote controller in the above communication system. Here, the control unit allows the communication unit to transmit a remote control code with respect to an operation target device in accordance with the user operation to the input unit and repeatedly executes a status check communication procedure including transmission of a status inquiry and waiting for receiving a status response from the operation target device after transmitting the remote control code at given time intervals during which the communication unit is in a dormant state.

According to still further another embodiment of the invention, the above communication device may be configured such that the control unit repeatedly executes the status check communication procedure until receiving the status response including transmission information from the operation target device.

According to yet further another embodiment of the invention, the above communication device may be configured such that the control unit repeatedly executes the status check communication procedure until receiving transmission information when receiving the status response including information indicating whether there is transmission information or not from the operation target device.

According to still yet further another embodiment of the invention, the above communication device may further include one or more function units. The control unit activates the function unit designated by transmission information received from the operation target device.

According to a further embodiment of the invention, the above communication device may be configured such that the control unit extends the time interval of status inquiries to be transmitted according to the number of transmission times.

According to a still further embodiment of the invention, there is provided a communication device including a communication unit performing bidirectional communication with a remote controller, a host function unit to be an operation target by a remote control code received by the communication unit and a control unit controlling operations of the device, which is operated as a host device in the above communication system. The control unit manages a status of the host function unit and allows the communication unit to transmit a status response in response to a status inquiry from the remote controller received at the communication unit.

According to a yet further embodiment of the invention, the above communication device may be configured such that the control unit manages a status whether there is transmission information with respect to the remote controller or not in the host function unit and allows the communication unit to transmit the status response including transmission information in response to the status inquiry from the remote controller received at the communication unit.

According to a still yet further embodiment of the invention, the above communication device may be configured such that the control unit manages the status whether there is transmission information with respect to the remote controller or not in the host function unit and allows the communication unit to transmit the status response including information indicating whether there is transmission information to the remote controller or not in response to the status inquiry from the remote controller received at the communication unit.

According to a furthermore embodiment of the invention, the above communication device may be configured such that the control unit includes an activation instruction of functions included in the remote controller in transmission information.

According to the embodiments of the invention, it is possible to provide the excellent communication system and the communication device capable of performing bidirectional communication between devices using a wireless network, in which information can be suitably transmitted to the remote controller by being triggered by the host device side while saving power consumption by allowing the remote controller to be in the reception waiting state intermittently.

According to the embodiments of the invention, the remote controller transmits the status inquiry at a given time interval after transmitting the remote control code, while the host device gives the status response indicating the presence of transmission information. Therefore, the remote controller can save power consumption by allowing the communication unit to be in the dormant state until the next status inquiry after transmitting the status inquiry. The remote controller also can respond to information transmission triggered by the host device side promptly while allowing the communication unit to be in the reception waiting state intermittently by making status inquiries to the host device at given time intervals. The remote control system to which the invention is applied can realize bidirectional communication which is more user friendly as compared with in related-art remote control systems.

Other characteristics and advantages of the invention will become clear by more detailed explanation based on a later-described embodiment of the invention and attached drawings.

DESCRIPTION OF THE PREFERRED EMBODIMENT

Hereinafter, an embodiment of the invention will be explained in detail with reference to the drawings.

Figure 1:
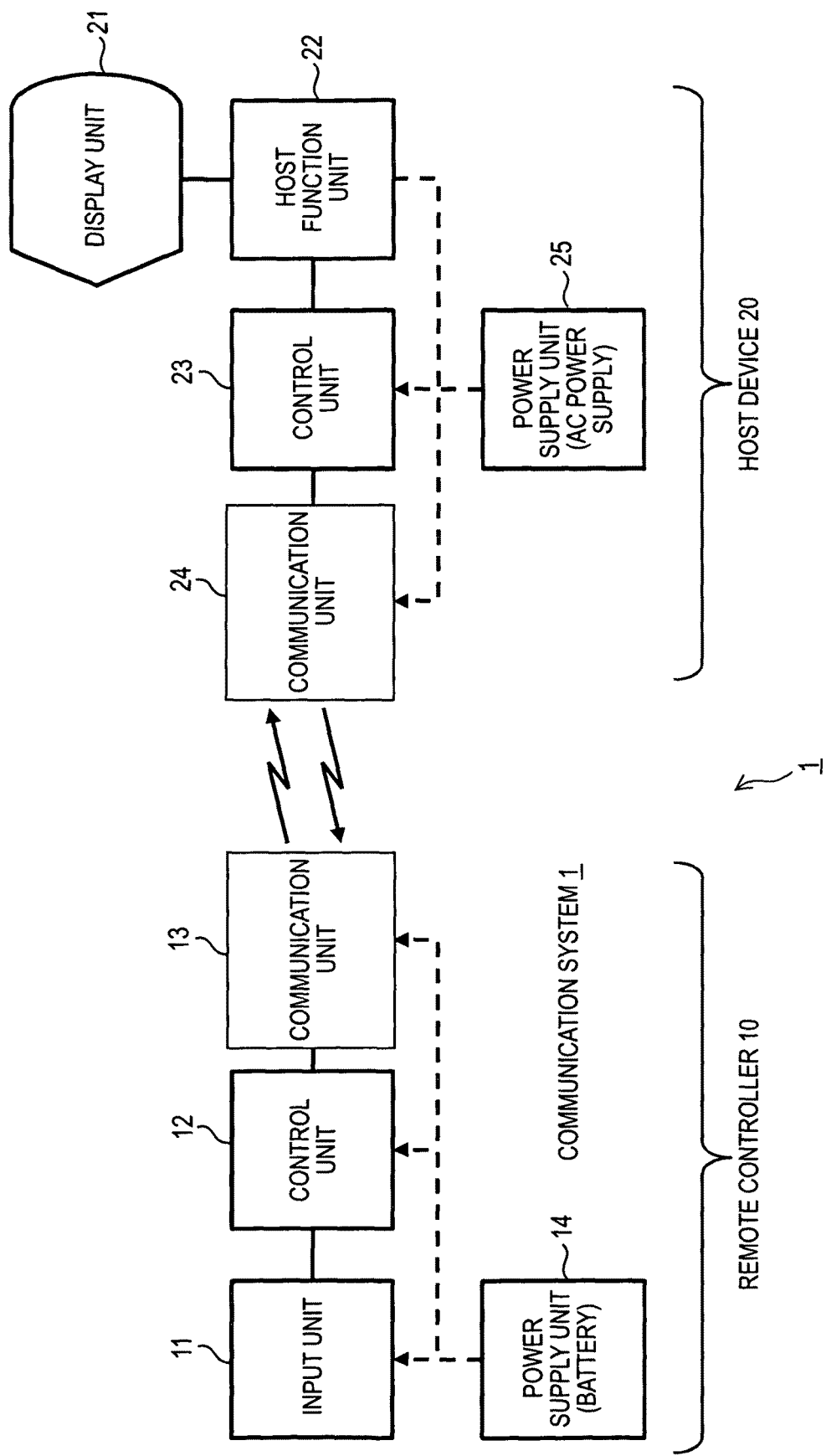
FIG. 1 is a diagram schematically showing functional configurations of a communication system according to an embodiment of the invention.

FIG. 1 schematically shows functional configurations of a communication system 1 according to an embodiment of the invention. The shown communication system 1 includes a remote controller 10 performing remote control by transmitting remote control codes and a host device 20 to be an operation target by the remote control codes.

The remote controller 10 includes an input unit 11, a control unit 12, a communication unit 13 and a power supply unit 14.

The power supply unit 14 uses a battery as a main power supply, supplying driving power supply to respective units.

The input unit 11 includes plural buttons such as cursor buttons, numeric buttons, a decision button, menu buttons and so on.

The communication unit 13 performs wireless communication operations by following, for example, an IEEE802.15.4 standard and enters a wireless network as a terminal station. In the embodiment, the remote controller 10 performs bidirectional communication with the host device 20 through the communication unit 13.

The control unit 12 controls operations in the remote controller 10 as a whole. For example, when the user presses any of buttons included in the input unit 11, a signal of a corresponding remote control code is transmitted from the communication 13. When information is transmitted by the host device 20 side, the control unit 12 allows the communication unit 13 to receive information and performs processing of the received information. The control unit 12 allows the communication unit 13 to intermittently perform reception operation in the embodiment, and the details of the point will be explained later.

The host device 20 of the other hand includes a display unit 21, a host function unit 22, a control unit 23, a communication unit 24 and a power supply unit 25.

The power supply unit 25 uses a commercial AC power supply as a main power supply, supplying driving power supply to respective units.

The communication unit 24 performs wireless communication operations by following, for example, the IEEE802.15.4 standard and operates the wireless network, for example, as an access point to accommodate the terminal station such as the remote controller 10.

The display unit 21 includes a liquid crystal display and so on. The host function unit 22 is an information device body such as a television receiver, an AV device and so on, which will be an operation target for the remote controller 10. The control unit 23 controls operations in the host device 20 as a whole.

For example, when a signal from the remote controller 10 is received in the communication unit 24, the control unit 23 performs analysis processing of the signal. When the received signal is the remote control code, the control unit 23 instructs the host function unit 22 to perform processing indicated by the remote control code. At the time of operating the remote controller, for example, plural menu items are displayed on a screen of the display unit 11. The user changes the selection of the menu item on the screen by using cursor buttons included in the input unit 11 of the remote controller 10, and fixes the selection of the menu item by pressing the decision button. The host function unit 22 activates an application corresponding to the selected menu item and generates transmission information to the remote controller 10 if necessary.

In the communication system shown in FIG. 1, the remote controller 10 is battery-driven, however, consumes little battery power when it is in the dormant state in all periods except periods when remote control codes are transmitted. However, when allowing the remote controller 10 to be in the reception waiting state intermittently for saving the power consumption, information transmission to the remote controller 10 triggered by the host device 20 side is not easy.

It is difficult that the remote controller 10 itself recognizes that there are functions activated on the host device 20 side and information transmission triggered by the host device 20 side caused by the activation of the functions through the operations such as pressing of buttons included in the input unit 11 such as the cursor buttons and the decision button. In other words, it is difficult that the remote controller 10 captures how long the user should wait for reception with the communication unit 13 from the last input operation to the input unit 11 (or last transmission of the remote control code) by the user.

Accordingly, in the embodiment, instead of allowing the communication unit 13 to be in the reception waiting state for a fixed period of time (for example, for approximately 1000 milliseconds) when any of buttons included in the input unit 11 is pressed (or after the remote control code is transmitted), the remote controller 10 repeats a status inquiry inquiring of the host device 20 whether transmission information has been generated or not at given intervals and allows the communication unit 13 to be in the dormant state in all periods except periods when the status inquiries are made.

Figure 2:
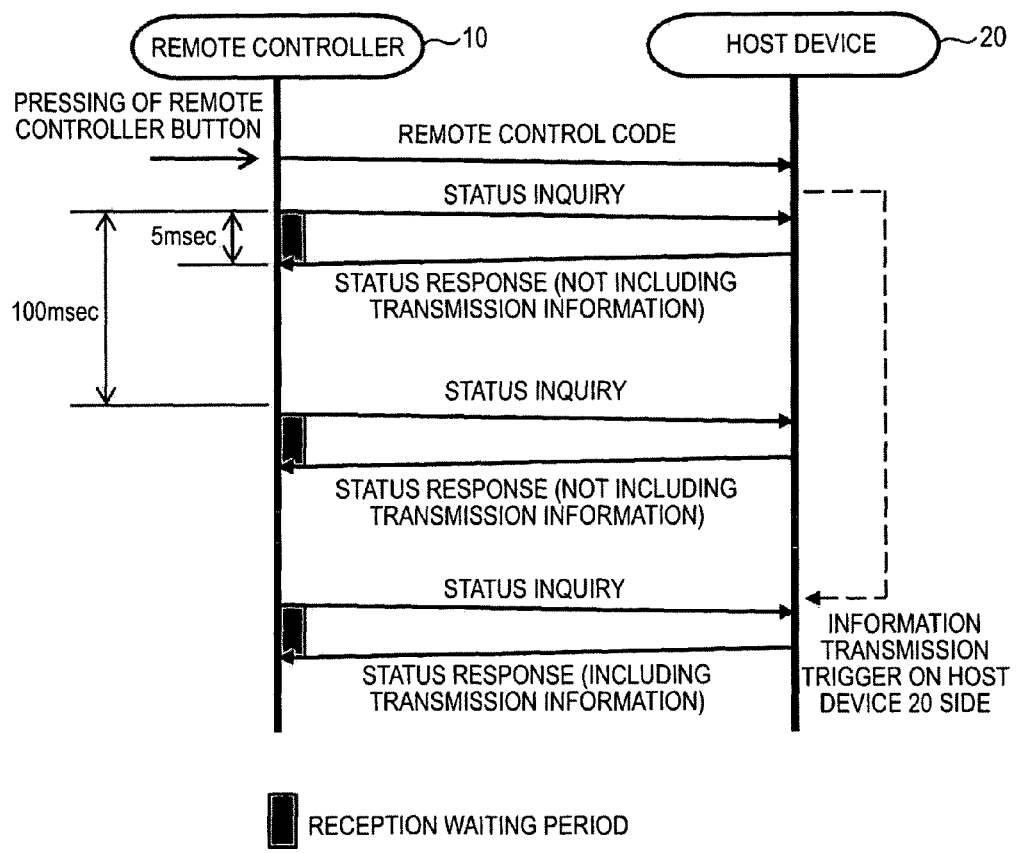
FIG. 2 is a diagram showing a communication sequence example of the communication system shown in FIG. 1.

FIG. 2 shows a communication sequence example of the communication system 1. In the drawing, solid arrows denote wireless signals complying with, for example, IEEE802.15.4 existing between the communication unit 13 on the remote controller 10 side and the communication unit 24 on the host device 20 side.

The remote controller 10 makes the status inquiry with respect to the host device 20 after transmitting a remote control code to the host device 20.

On the other hand, the host device 20 executes processing corresponding to the received remote control code. The host device 20 gives a status response not including transmission information when transmission information to be transmitted to the remote controller 10 is not generated at the time of receiving the status inquiry.

The remote controller 10 allows the communication unit 13 to be in the dormant state when receiving the status response not including transmission information from the host device 20. After that, the remote controller 10 allows the communication unit 13 to operate again after a given time interval, transmitting the status inquiry to the host device 20 as well as waiting for a response from the host device 20. The remote controller 10 makes status inquires in every 100 milliseconds in the shown example, however, it is not necessary that the time interval is constant. A case in which the time interval when the status inquiry is made is not constant will be explained later.

After that, the remote controller 10 repeats the status inquiry to the host device 20 and the waiting for receiving the response from the host device 20, and repeats the operation of allowing the communication unit 13 to be in the dormant state when receiving the status not including transmission information.

Here, when transmission information addressed to the remote controller 10 is generated on the host device 20 side, the host device 20 gives the status response including transmission information with respect to the status inquiry from the remote controller 10. Then, the remote controller 10 can check the status of the host device 20 when receiving the status response including transmission information and can stop the reception of the communication unit 13 immediately. After that, it is not necessary that the remote controller 10 makes the status inquiry and can keep the dormant state of the communication unit 13.

In the communication sequence shown in FIG. 2, the remote controller 10 can inquire whether there exists a trigger of information transmission on the host device 20 side by the status inquiry. Therefore, it is possible to perform information transmission to the remote controller 10 triggered by the host device 20 side and to allow the communication unit 13 of the remote controller 10 side to be in the reception waiting state intermittently to save power consumption.

Necessary time from the status inquiry by the remote controller 10 until receiving the response from the host device 20 is approximately 1 millisecond to 5 milliseconds in ordinary circumstances. It is necessary that the remote controller 10 allows the communication unit 13 to be in the reception waiting state until the status response is given by the host device 20, however, the remote controller 10 can allow the communication unit 13 to be in the dormant state until making the status inquiry next time after receiving the status response. In the case where the status inquiry is performed, for example, at every 100 milliseconds and necessary time for the inquiry is 5 milliseconds, the reception period will be 1/20 as compared with a case where the reception waiting time is taken for 100 milliseconds, as a result, power consumption will be approximately 1/20.

In the communication sequence shown in FIG. 2, a modification example in which the time interval of status inquiries made by the remote controller 10 is not constant and the time interval is gradually extended can be considered. For example, the remote controller 10 gradually extends the time interval from the last status inquiry by taking a time point when the remote control code is transmitted to the host device 20 as a starting point. In such case, the remote controller 10 can respond to a response of a short period of time to a response of a long period of time from the host device 20. A method of extending the time interval of status inquiries made by the remote controller 10 will be explained in details later.

In either case where the time interval of status inquiries is constant or where it is variable, the remote controller 10 may set a timer by using a time point when the remote control code is transmitted or other optional time points as a starting point so as not to make the status inquiry after the time-out.

It is preferable that the host device 20 not only responds to the status inquiry from the remote controller 10 concerning whether there is transmission information to the remote controller 10 or not but also adds other information. For example, the remote controller 10 may transmit information of a state of power supply on the host device 20 side, information of a flag or the like indicating that the device is not in the state of generating transmission information. It is also preferable that the remote controller 10 does not make the status inquiry after this kind of information is received. Other information included in the status response will be explained later.

It is also preferable to arrange status processing closest to a network layer for speeding up the response to the status inquiry both in the remote controller 10 and the host device 20. When the response for the status inquiry is speeded up, battery power consumption on the remote controller 10 side can be suppressed accordingly. When communication is performed by using RF4CE, a status response application is provided close to the network layer. Accordingly, the host device 20 side can make responses regardless of the power supply state of the device itself. A method of mounting the status processing in each of the remote controller 10 and the host device 20 will be explained later.

Subsequently, a specific application example of the communication sequence shown in FIG. 2 will be explained.

Figure 3:
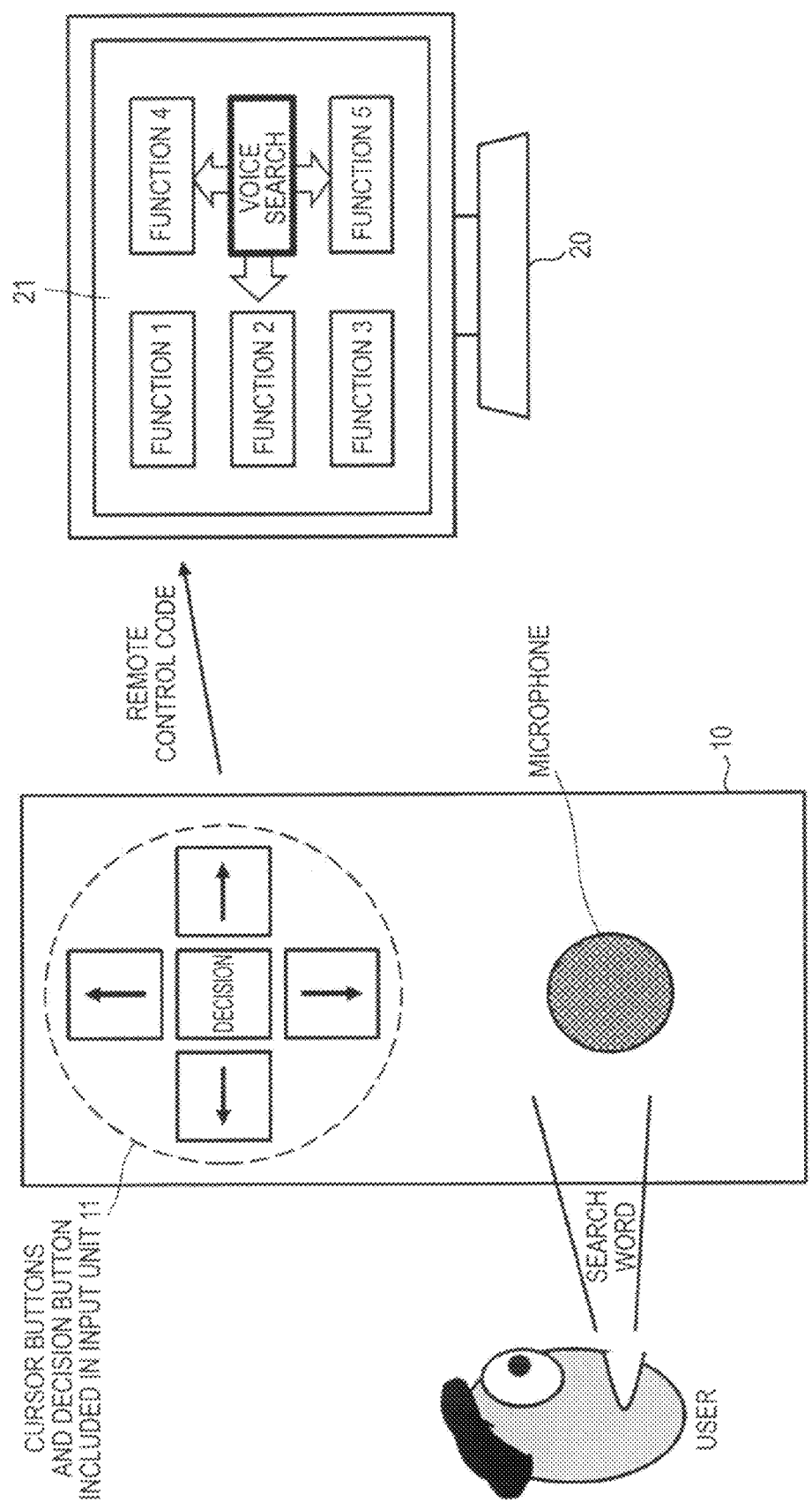
FIG. 3 is a view showing a state in which the user selects a function of the host device side by using the remote controller.

FIG. 3 shows a state in which the user selects a function of the host device 20 side by using the remote controller 10.

The input unit 11 of the remote controller 10 includes cursor buttons for instructing movements of up, down, left and right as well as a decision button for deciding the selection. The input unit 11 also has a microphone for inputting voice data. On a screen of the display unit 21 of the host device 20 side, a list of functions provided in the host function unit 22 is displayed by icons. In the shown example, six types of menu items including functions 1 to 5 and "voice search" are displayed by icons.

Every time the user presses any of the operation buttons, the remote controller 10 outputs a corresponding remote control code from the communication unit 13 as a wireless signal. On the other hand, when the host device 20 side receives the wireless signal at the communication unit 24, the control unit 23 allows the host function unit 22 to perform operation in accordance with an instruction shown by the remote control code. When the cursor button is operated, the host device 20 moves the selection display of icons to up, down, left or right, and when the decision button is pressed, the selection of the function corresponding to the selected icon is fixed and the host function unit 22 activates the corresponding processing.

In the shown example, the user selects the icon of "voice search" by operating the cursor button, and further fixes the selection of the function of "voice search" by pressing the decision button. Then, the host function unit 22 activates the processing of "voice search" and the screen of the display unit 21 is changed to a voice search screen shown in FIG. 4. The voice search screen includes an input field in which a search word is inputted.

Figure 4:
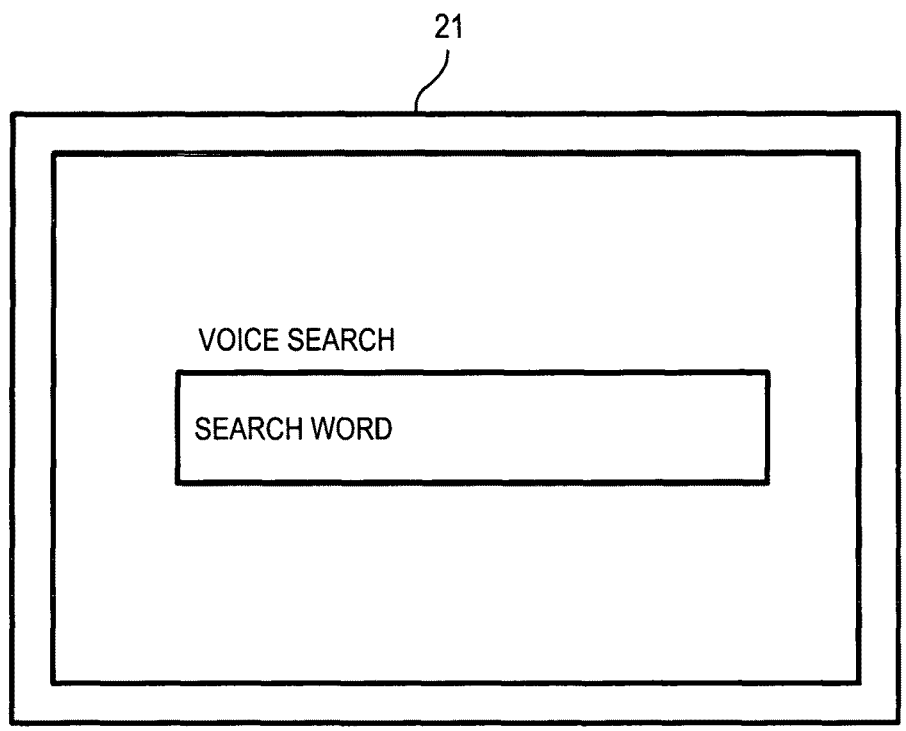
FIG. 4 is a view showing a state in which a voice search screen is displayed on a display unit.

On the remote controller 10 side, the user can input the search word by voice through the microphone (when power is on in a microphone circuit. The inputted voice data is outputted from the communication unit 13 as a wireless signal. The host device 20 side makes text from the received voice data by voice recognition, displaying the text in the input field of the voice search screen. FIG. 4 shows an example in which "search word" is inputted as the search word by voice input. When the user presses the decision button, the remote controller 10 transmits the corresponding remote control code from the communication unit 13. The host device 20 side fixes the inputted search word and starts searching when receiving the remote control code.

During a period until the user selects a particular function of the host device 20 side through the remote controller 10, the remote controller 10 just transmits the remote control code to the host device 20, therefore, the information transmission is unidirectional. On the other hand, when the selection of the particular function such as "voice search" is fixed and the processing of the function is activated on the host device 20 side, the transmission information to the remote controller 10 is generated by the processing, therefore, there exists information transmission triggered by the host device 20 side.

In the example shown in FIG. 3 and FIG. 4, when the activation of the processing of "voice search" is completed in the host device 20 through the operation of the remote controller 10 by the user, the transmission information indicating activation of the microphone (application of the power to the microphone circuit) is generated on the host device 20 side with respect to the remote controller 10.

The remote controller 10 repeats the status inquiry for inquiring of the host device 20 whether transmission information is generated or not at given time intervals after any of buttons included in the input unit 11 is pressed and the remote control code is transmitted, allowing the communication unit 13 to be in the dormant state in all periods except the status inquiries. Therefore, the remote controller 10 can detects whether transmission information has been generated or not on the host device 20 side while allowing the communication unit 13 to operate intermittently and suppressing power consumption.

The remote controller 10 applies the power to the microphone circuit when information indicating activation of the microphone is included in the status response including transmission information from the host device 20. According to this, the user can input voice toward the microphone. The inputted voice data is outputted from the communication unit 13 as the wireless signal.

Figure 5:
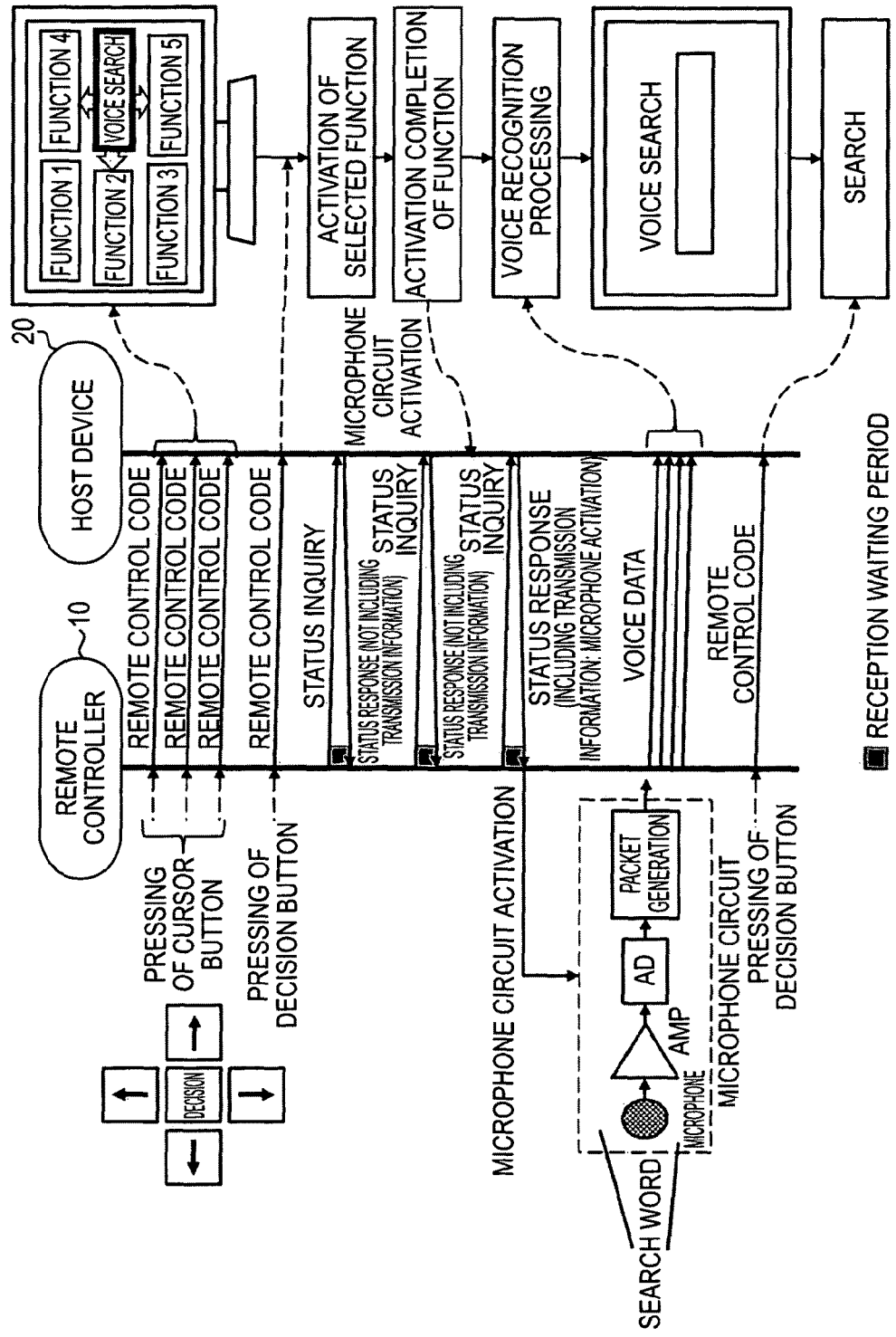
FIG. 5 is a diagram showing a communication sequence example of the communication system in the case where the user selects the function of the host device side by using the remote controller.

FIG. 5 shows a communication sequence example of the communication system 1 in the case where the user selects the function of the host device 20 side by using the remote controller 10 (refer to FIG. 3 and FIG. 4). In the drawing, solid arrows denote wireless signals complying with, for example, IEEE802.15.4 existing between the communication unit 13 on the remote controller 10 side and the communication unit 24 on the host device 20 side.

Every time the user presses any of the operation buttons, the remote controller 10 outputs the corresponding remote control code from the communication unit 13 as the wireless signal. In response to this, when the host device 20 side receives the wireless signal at the communication unit 24, the control unit 23 allows the host function unit 22 to operate in accordance with the instruction indicated by the remote control code.

When the cursor button is pressed on the remote controller 10 side, the host device 20 side moves the selection display of the icon to up, down, left or right on the screen of the function list displayed on the display unit 21.

When the decision button is pressed on the remote control 10 side, the selection of the function corresponding to the selected icon is fixed, and the host function unit 22 activates corresponding processing. Here, the function of "voice search" is selected. On the host device 20 side, it takes time from the fixing of the selection of the function of "voice search" until the host function unit 22 starts activation of the voice search function and completes the activation.

The remote controller 10 makes the status inquiry to the host device 20 at given intervals after the user presses the decision button.

It takes time from the time when the decision button is pressed on the remote control 10 side and the selection of the function of "voice search" is fixed on the host device 20 side until the host function unit 22 starts activation of the voice search function and completes the activation. During a period until the completion of activation of the voice search function, the host device 20 gives the status response not including transmission information when receiving the status inquiry because transmission information is not generated yet. The remote controller 10 allows the communication unit 13 to be in the dormant state for a given time interval when receiving the status response not including transmission information from the host device 20.

After that, the remote controller 10 repeats the status inquiry to the host device 20 and the waiting for receiving the response from the host device 20, and then, repeats the operation of allowing the communication unit 13 to be in the dormant state when receiving the status not including transmission information.

When the activation of the voice search function is completed at the host function unit 22, transmission information indicating activation of the microphone (application of the power to the microphone circuit) is generated with respect to the remote controller 10 in the host device 20. The host device 20 gives the status response including transmission information with respect to the status inquiry from the remote controller 10.

The remote controller 10 applies the power to the microphone circuit when the status response including transmission information from the host device 20 includes information indicating activation of the microphone. According to the activation, the user can input voice toward the microphone. The inputted voice data is outputted from the communication unit 13 as the wireless signal.

The remote controller 10 can confirm to activate the microphone (to apply the power to the microphone circuit) and can immediately stop the reception in the communication unit 13 when receiving the status response including transmission information. After that, it is not necessary that the remote controller 10 makes the status inquiry and the dormant state of the communication unit 13 can be maintained.

The host device 20 side makes text from the received voice data by voice recognition, displaying the text in the input field of the voice search screen. When the user presses the decision button, the remote controller 10 transmits the corresponding remote control code from the communication unit 13. The host device 20 side fixes the inputted search word and starts searching when receiving the remote control code.

Figure 6:
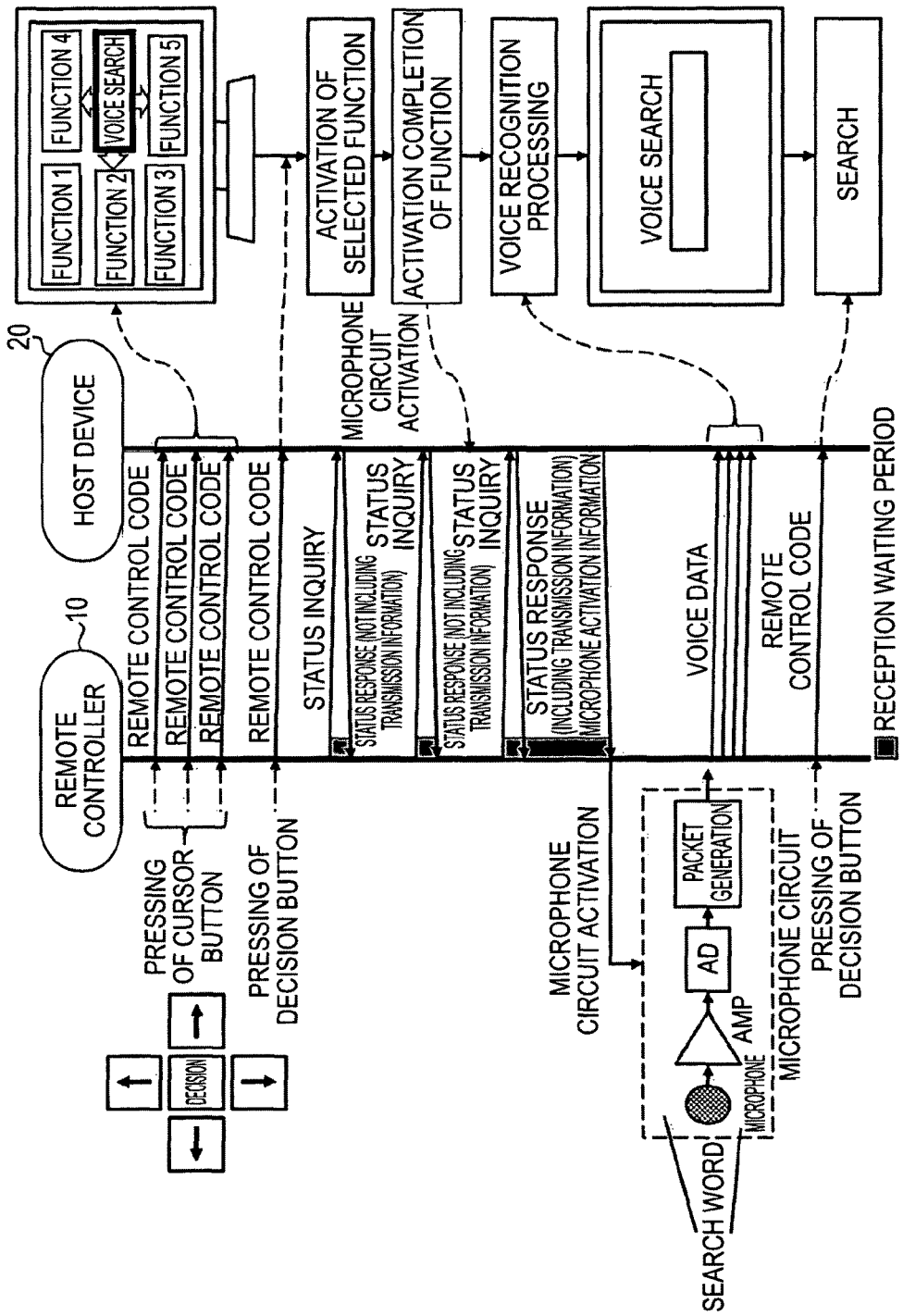
FIG. 6 is a diagram showing a modification example of the communication sequence shown in FIG. 5.

FIG. 6 shows a modification example of the communication sequence shown in FIG. 5. The point in which the remote controller 10 makes the status inquiry to the host device 20 at given intervals after transmitting the remote control code and the point in which the host device 20 gives the status response not including transmission information when there is no transmission information and the gives the status response including transmission information when transmission information is generated are the same as the example shown in FIG. 5.

The example of FIG. 6 differs from the example of FIG. 5 in a point that, when the host device 20 gives the status response including transmission information, the status response does not include information indicating activation of the microphone.

In this case, the remote controller 10 continues receiving operation and waits for transmission information in the communication unit 13 after receiving the status response including transmission information. Then, when receiving transmission information indicating activation of the microphone, the remote controller 10 stops receiving in the communication unit 13 and applies the power to the microphone circuit. According to this, the user can input voice toward the microphone. The inputted voice data is outputted from the communication unit 13 as the wireless signal.

The host device 20 side makes text from the received voice data by voice recognition, displaying the text in the input field of the voice search screen. When the user presses the decision button, the remote controller 10 transmits the corresponding remote control code from the communication unit 13. The host device 20 side fixes the inputted search word and starts searching when receiving the remote control code.

Figure 7:
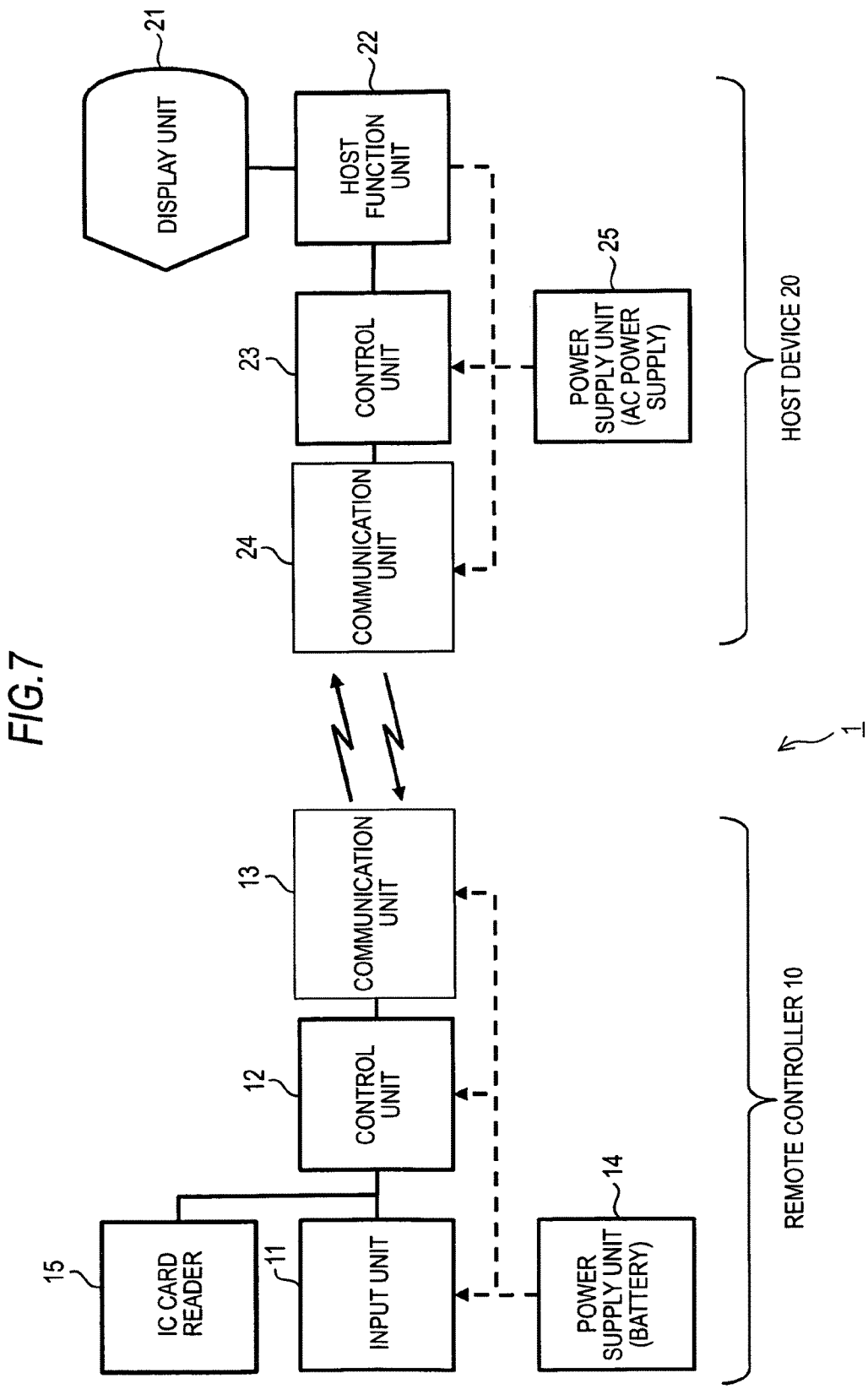
FIG. 7 is a diagram showing a modification example of the communication system shown in FIG. 1.

FIG. 7 shows a modification example of the communication system shown in FIG. 1. The example differs from the example of FIG. 1 in a point that the remote controller 10 includes an IC card reader 15.

The IC card reader can perform secure data transmission with an IC card in transmission distances of approximately 0 (zero) to several dozen centimeters by using a communication system complying with international standards such as ISO/IEC IS 18092 (NFC IP-1). As main applications, reading of authentication information from the IC card, use of valuable information stored in the IC card and so on can be cited. For example, the host device 20 can pay a use charge of pay contents in the television receiver through the IC card reader 15 by holding the IC card over the remote controller 10.

Figure 8:
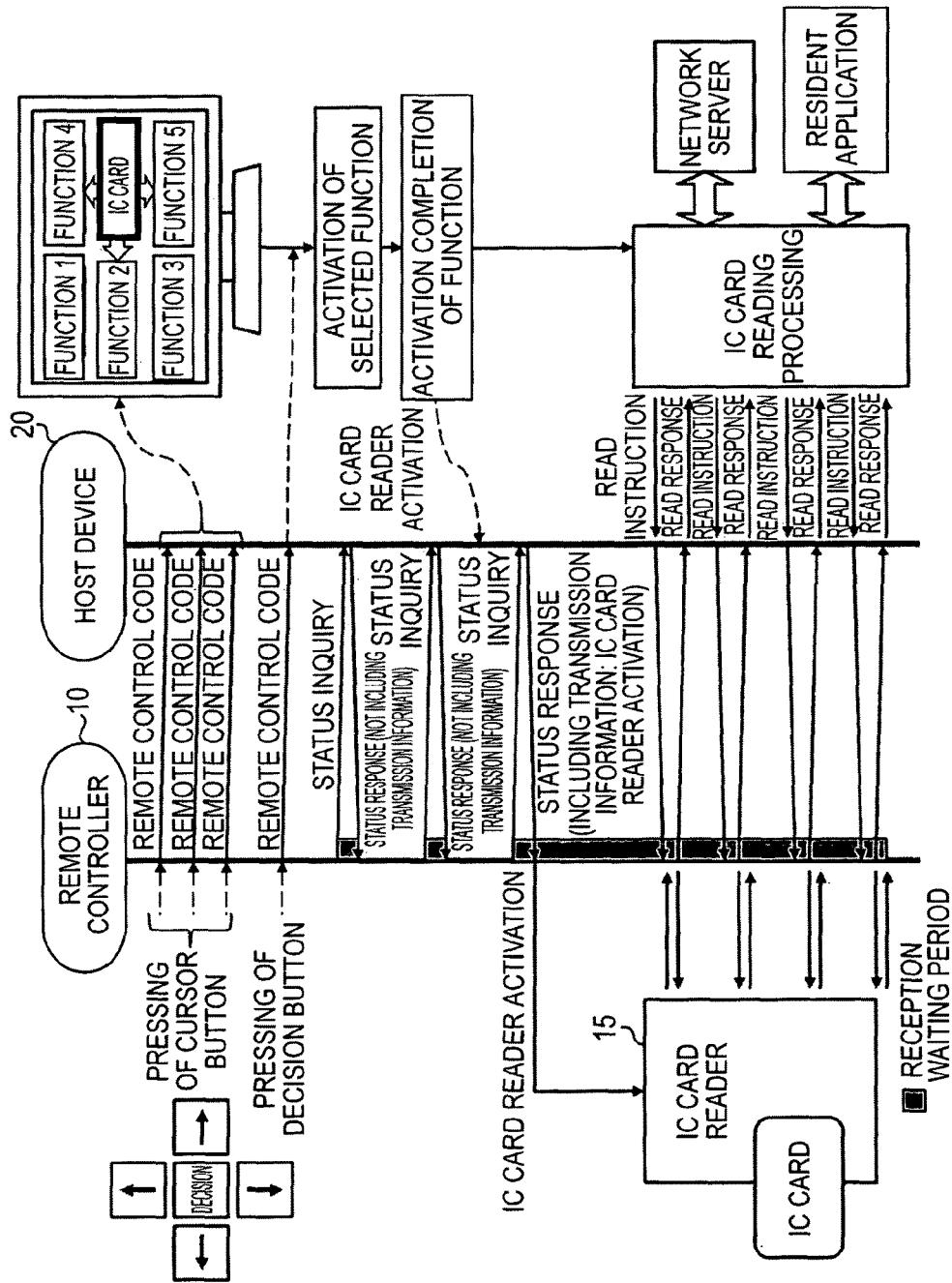
FIG. 8 is a diagram showing a communication sequence example of the communication system shown in FIG. 7.

FIG. 8 shows a communication sequence example of the communication system 1 shown in FIG. 7. In the drawing, solid arrows denotes wireless signals complying with, for example, IEEE802.15.4 existing between the communication unit 13 of the remote controller 10 side and the communication unit 24 on the host device 20 side.

On the screen of the display unit 21 of the host device 20 side, a list of functions provided in the host function unit 22 is displayed by icons. In the shown example, six types of menu items including functions 1 to 5 and "IC card" are displayed by icons. The function of "IC card" is a function of performing authentication and payment processing by using the IC card which is held over the remote controller 10 by the user.

Every time the user presses any of operation buttons, the remote controller 10 outputs the corresponding remote control code from the communication unit 13 as the wireless signal. On the other hand, when the host device 20 receives the wireless signal at the communication unit 24, the control unit 23 allows the host function unit 22 to perform operation in accordance with an instruction indicated by the remote control code.

When the cursor button is pressed on the remote controller 10 side, the host device 20 side moves the selection display of the icon to up, down, left or right on the screen of the function list displayed on the display unit 21.

When the decision button is pressed on the remote control 10 side, the selection of the function corresponding to the selected icon is fixed, and the host function unit 22 activates corresponding processing. Here, the function of "IC card" is selected.

The remote controller 10 makes the status inquiry to the host device 20 at given intervals after the user presses the decision button.

It takes time from the time when the decision button is pressed on the remote control 10 side and the selection of the function of "IC card" is fixed on the host device 20 side until the host function unit 22 starts activation of the IC card function and completes the activation. During a period until the activation of the IC card function is completed, the host device 20 gives the status response not including transmission information when receiving the status inquiry because transmission information is not generated yet. The remote controller 10 allows the communication unit 13 to be in the dormant state for a given time interval when receiving the status response not including transmission information from the host device 20.

After that, the remote controller 10 repeats the status inquiry to the host device 20 and the waiting for receiving the response from the host device 20, and then, repeats the operation of allowing the communication unit 13 to be in the dormant state when receiving the status not including transmission information.

When the activation of the IC card function is completed at the host function unit 22, transmission information is generated with respect to the remote controller 10 in the host device 20. The host device 20 gives a status response including, transmission information (not including information indicating activation of the IC card reader) with respect to the status inquiry from the remote controller 10.

In this case, the remote controller 10 continues the receiving operation and waits for receiving transmission information in the communication unit 13 after receiving the status response including transmission information. Then, when receiving transmission information indicating activation of the IC card reader, the remote controller 10 stops receiving in the communication unit 13 and applies the power to the IC card reader 15.

On the host device 20 side, when the activation of the function of "IC card" is completed, the screen of the display unit 21 is changed to the screen for reading the IC card. An instruction for the user to hold the IC card over the remote controller 10 or the like is displayed on the screen, though not shown.

The host device 20 instructs reading from the IC card as processing of the function of "IC card", and the instruction is outputted from the communication unit 24 as a wireless signal.

The remote controller 10 side performs reading processing of data designated by the IC card in accordance with the reading instruction from the host device 20 when receiving the wireless signal at the communication unit 13. Then, the remote controller 10 outputs the read data from the communication unit 13 as the wireless signal.

Subsequently, the method of extending the time interval of status inquiries made by the remote controller 10 will be explained in detail.

The examples in which the host device 20 activates and uses the function modules of the remote controller 10 side such as the microphone or the IC card reader 15 have been cited as the above. Variations may occur in time from the activation to the activation completion according to functions provided on the host device 10 side. The activation time may increase according to types of functions such as a case where there are plural functions. For example, there is a function of operating in accordance with an instruction for accessing to the IC card 15 from a network server through an external network such as Internet in functions using the IC card reader 15, in which time until the access instruction comes may largely vary according to effects of line speed and the like.

The remote controller 10 can detect that the status has been changed from the status not having transmission information to the status having transmission information (or instruction for activating the microphone or the IC card reader 15) on the host device 20 side at an earlier timing in the case of making the status inquiry to the host device 10 frequently (namely, at short time intervals). However, when it takes long time to complete activation of the function of the host device 20 selected through the operation of the remote controller 10, the number of times of status inquires to be made until the status of the host device 20 is changed to the status having transmission information (or until the activation of the microphone or the IC card reader 15 is instructed) is increased by making the status inquiry at short time intervals, which causes unnecessary power consumption by the increase.

When the remote controller 10 transmits the status inquiries at long time intervals, the number of times of unnecessary status inquiries is reduced, and a waste of power consumption can be cut by the reduction.

In the case where it takes a short time to complete activation of the selected function, activation of the function module such as the microphone or the IC card reader 15 on the remote controller 10 side may be delayed when the status inquiries are transmitted at long time intervals. Concerning the function which is activated in a short time, the remote controller 10 side is preferably activated soon.

Summarizing the above examples, it is difficult to fix time intervals of status inquiries to be constant on the remote controller 10 side when the host device 20 has plural functions with different activation times, or when there are functions in which the activation time varies.

In view of the above, the present inventors propose a method of extending the time interval of status inquiries made by the remote controller 10 gradually so as to correspond to variations in activation times of the above functions on the host device 20 side.

Figure 9:
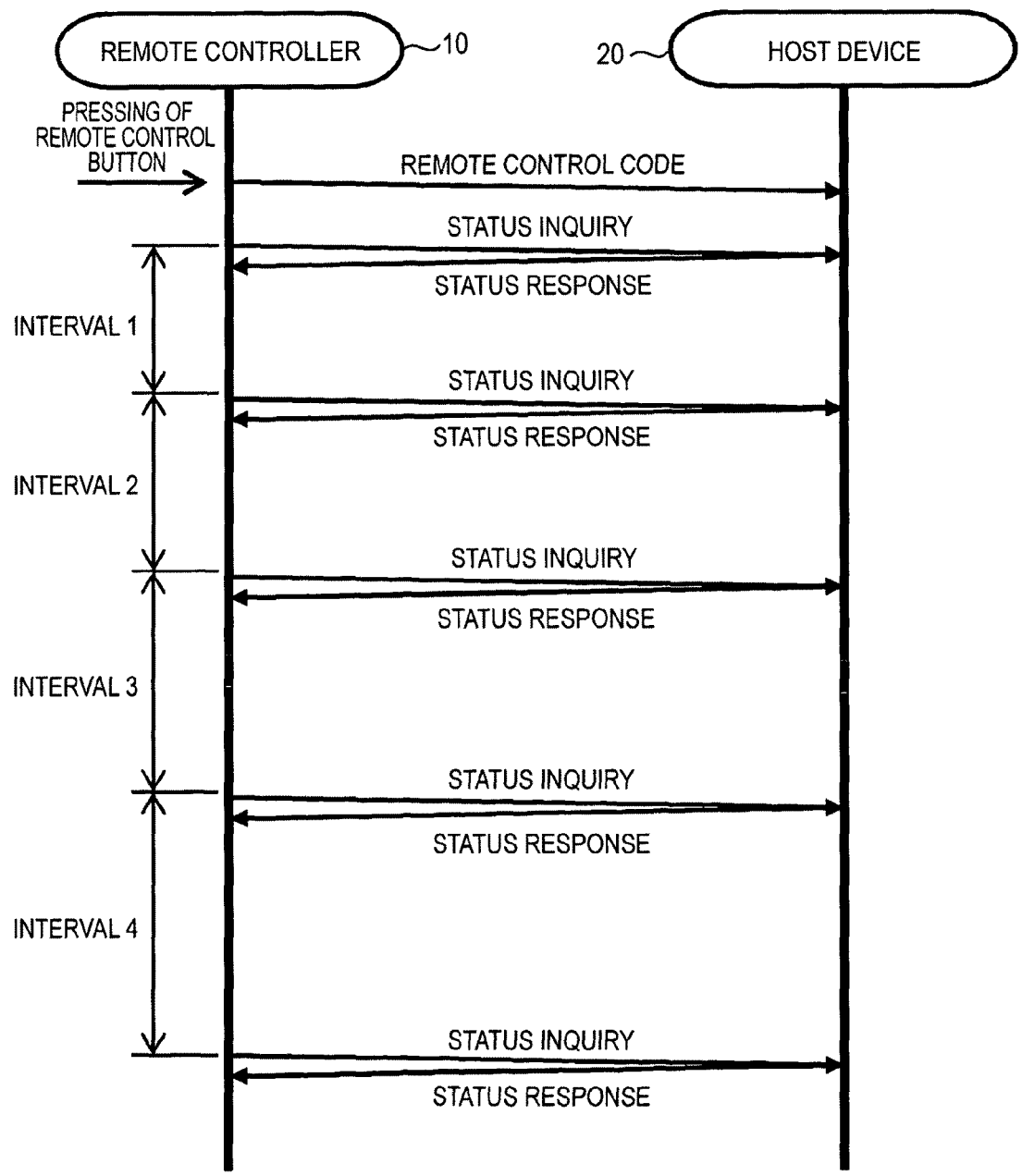
FIG. 9 is a diagram showing a communication sequence example in which the remote controller gradually extends the time interval of status inquiries to be transmitted.

FIG. 9 shows a communication sequence example in which the remote controller 10 gradually extends the time interval of status inquiries to be transmitted. In the shown example, the remote controller 10 extends the time interval from the last status inquiry gradually in a manner of an interval 1, an interval 2, an interval 3 and an interval 4 . . . in accordance with the number of transmission of status inquiries.

The time interval of inquiries is gradually extended in accordance with the number of times of status inquiries, thereby activating the remote controller 10 soon when the activation time of the selected function of the host device 20 is short. Conversely, when the activation time of the selected function is long, the number of times of unnecessary status inquiries is reduced and a waste of power consumption in the remote controller 10 can be cut by the reduction.

In the communication sequence example shown in FIG. 9, the increasing amount of time intervals in accordance with the number of times of status inquiries is easy to be calculated by setting to what percentage the activation of the remote controller 10 can be extended with respect to the activation time of the function. For example, when the percentage is 20%, a point obtained by adding 20% of a period of time taken by n-times of status inquiries will be a point "n+1" of a next status inquiry. The method of determining the time intervals of status inquiries is not limited to this and the time interval can be increased in a quadratic curve or exponentially.

In any case, the interval from the last status inquiry to the next status inquiry to be transmitted is extended as the number of times of status inquiries is increased, thereby obtaining expected advantages such that the number of times of unnecessary status inquiries is suppressed to thereby reduce power consumption when the function with long activation time is selected and that the status change of the host device 20 can be detected smoothly when the function with short activation time is selected.

According to the communication sequences shown in FIG. 2, FIG. 5, FIG. 6, FIG. 8 and FIG. 9, the remote controller 10 transmits the status inquiry after transmitting the remote control code at a given time interval. The host device 20 gives the status response indicating presence of transmission information in response to the above transmission. Therefore, the remote controller 10 can save power consumption by allowing the communication unit 13 to be in the dormant state until the next status inquiry after transmitting the status inquiry. Additionally, the remote controller 10 makes status inquiries to the host device 20 at given intervals, thereby promptly responding to information transmission triggered by the host device 20 side while allowing the communication unit 13 to be in the reception waiting state intermittently. The remote control system to which the invention is applied can realize bidirectional communication which is user friendly as compared with related-art remote control systems.

Figure 10:
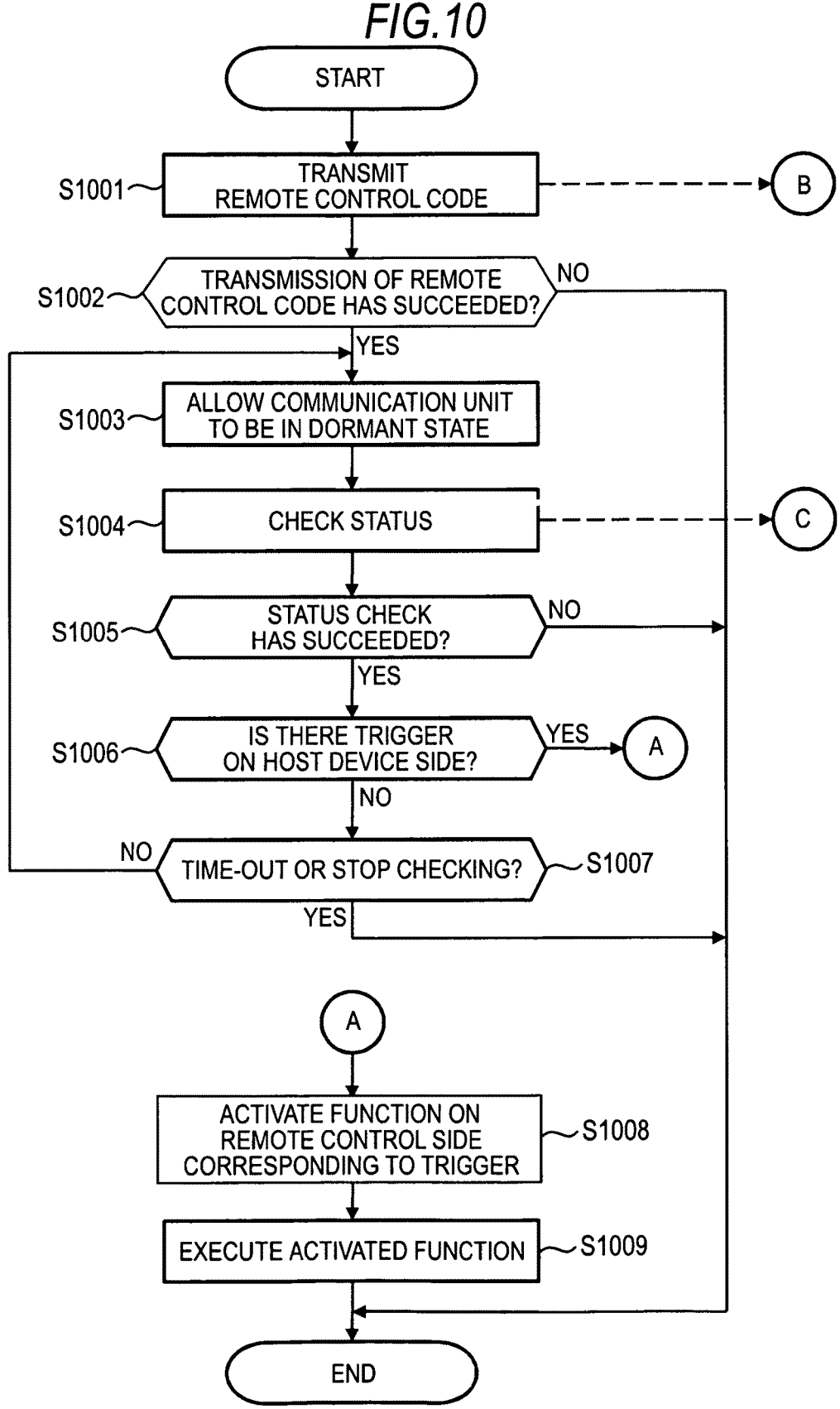
FIG. 10 is a flowchart showing processing procedures executed on the remote controller side.

FIG. 10 shows processing procedures executed on the remote controller 10 side for realizing the communication sequences shown in FIG. 2, FIG. 5, FIG. 6, FIG. 8 and FIG. 9 in a form of a flowchart. The processing procedures are activated every time any of buttons included in the input unit 11 is pressed on the remote control 10 side. When the button is newly pressed during execution of the processing procedures shown in FIG. 10, the processing is cut off, and processing shown in FIG. 10 is newly executed.

First, the remote controller 10 transmits a remote control code in accordance with a user operation with respect to the input unit 11 (Step S1001).

Figure 12:
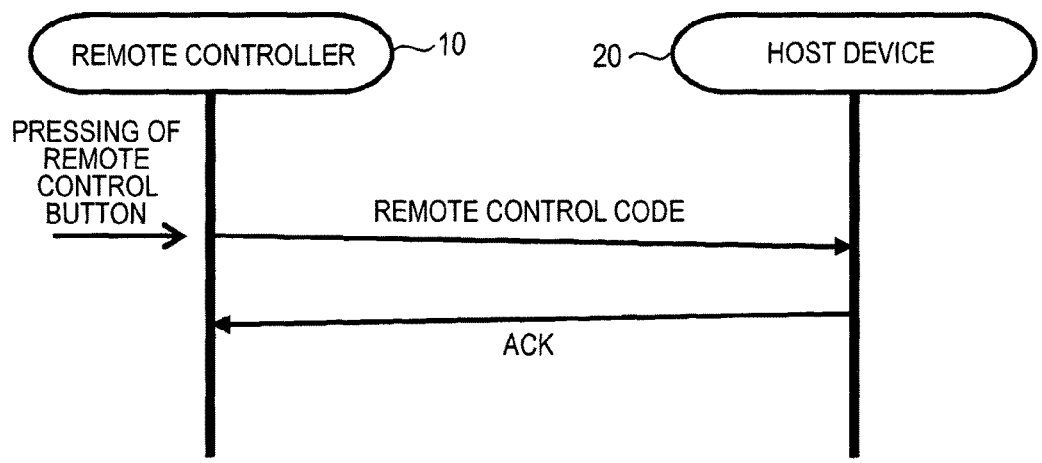
FIG. 12 is a diagram showing a communication sequence in which the host device gives an ACK in response to the transmission of a remote control code from the remote controller side.

Here, the communication sequence in which the host device 20 gives an ACK in response to the transmission of the remote control code from the remote controller 10 side is assumed (refer to FIG. 12). Therefore, the remote controller can check the attainment of the remote control code by receiving the ACK from the host device 20. Conversely, when the ACK is not received within a fixed period of time after transmitting the remote control code, retry of transmission of the remote control code is performed.

Next, the remote controller 10 checks whether the transmission of the remote control code has succeeded or not (Step S1002).

The remote controller 10 determines that the transmission of the remote control code has failed when not receiving the ACK within a fixed period of time after repeating the retry of transmission of the remote control code ("No" in Step S1002), and skips all the subsequent processes to end the processing routine.

On the other hand, the remote controller 10 confirms that the transmission of the remote control code has succeeded by receiving the ACK from the host device 20 within a fixed period of time after transmitting the remote control code ("Yes" in Step S1002). In this case, the remote controller 10 continues subsequent processes.

The remote controller 10 allows the communication unit 13 to be in the dormant state for a given time interval after transmitting the remote control code and other packets (Step S1003). The time interval is not always constant in this case and may be variable. There is also the case in which the time interval is gradually extended in accordance with the number of times of status inquiries (the number of times that a loop including Step S1002 to S1007 is executed) (refer to FIG. 9).

Then, the remote controller 10 allows the communication unit 13 to operate again after the given time interval passes, transmitting the status inquiry to the host device 20 and checking the status of the host device 20 in the state of waiting for the response from the host device 20 (Step S1004).

Figure 13:
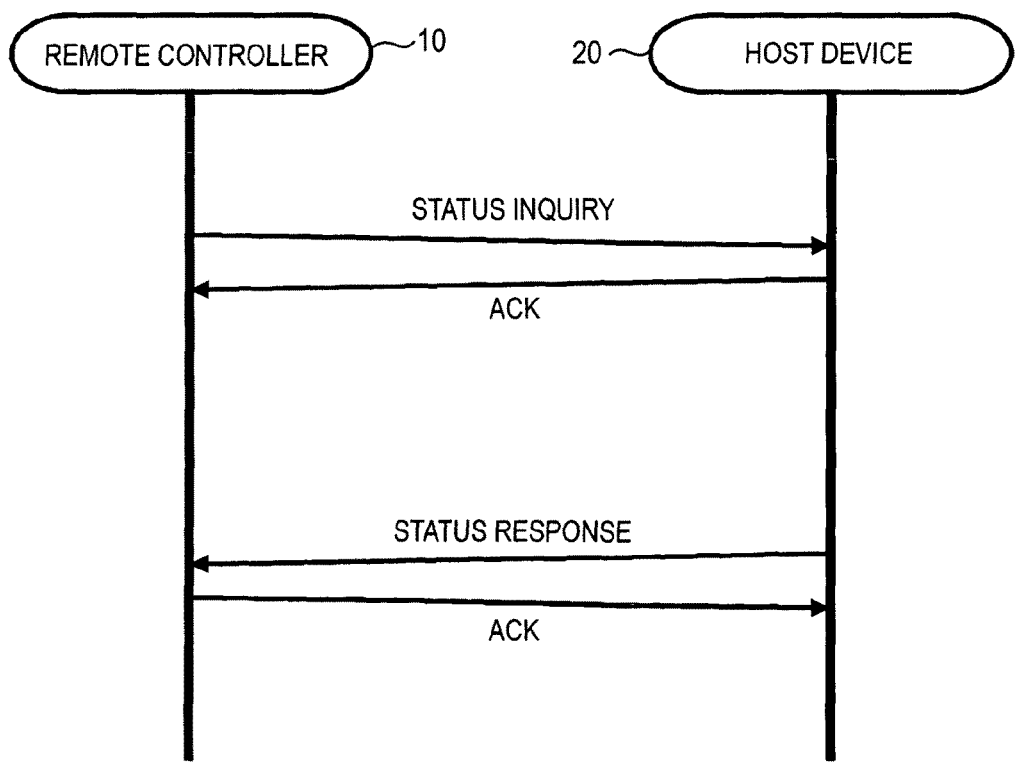
FIG. 13 is a diagram showing a communication sequence in which the host device gives the ACK in response to the transmission of the status inquiry from the remote controller, and the remote controller gives the ACK with respect to the status response from the host device side.

As described above, the host device 20 gives the status response with respect to the status inquiry from the remote controller 10. A communication sequence in which the host device 20 gives the ACK in response to the transmission of the status inquiry from the remote controller 10 side, and the remote controller 10 gives the ACK with respect to the status response from the host device 20 side (refer to FIG. 13) is assumed though not shown in communication sequences shown in FIG. 2, FIG. 5, FIG. 6, FIG. 8 and FIG. 9. The remote controller 10 can check the attainment of the status inquiry by receiving the ACK from the host device 20 after transmitting the status inquiry. When the ACK is not received within a given period of time after transmitting the status inquiry, the retry of transmission of the status inquiry is performed. Similarly, the host device 20 can check the attainment of the status response by receiving the ACK from the remote controller 10 after transmitting the status response. Conversely, when the ACK is not received within a fixed period of time after transmitting the status response, the retry of transmission of the status response is performed.

Next, the remote controller 10 checks whether the transmission of status check of the host device 20 has succeeded or not (Step S1005).

The remote controller 10 determines that the status check of the host device 20 has failed when not receiving the status response within a fixed period of time after repeating the retry of transmission of the status inquiry ("No" in Step S1005) and skips all the subsequent processes to end the processing routine.

On the other hand, the remote controller 10 confirms that the status check of the host device 20 has succeeded by receiving the status response from the host device 20 within a fixed period of time after transmitting the status inquiry ("Yes" in Step S1005). In this case, the remote controller 10 further continues subsequent processes.

Next, the remote controller 10 analyzes the contents of the received status response to check whether there is transmission information, namely, information transmission triggered by the host device 20 side is included or not (Step S1006).

Here, when the status response not including transmission information is received (namely, there is no information transmission triggered by the host device 20 side) ("No" in Step S1006), the remote controller 10 subsequently checks whether the status check processing reaches time-out or not as well as whether the status check processing is stopped or not (Step S1007). The case in which the status check processing reaches time-out includes, for example, a case where a given period of time has passed after the status check processing is started, a case in which the number of times of transmission retries of the status inquiry reaches a given number of times, a case in which the trigger of information transmission processing on the host device 20 side is not confirmed in the given period of time or in the given number of times and so on.

When the status check processing reaches time-out, or when the status check processing is stopped ("Yes" of Step S1007), the remote controller 10 skips all the subsequent processes to end the processing routine.

On the other hand, when the status check processing does not reach time-out as well as when the status check processing is not stopped ("No" of Step S1007), the process returns to Step S1003, and the remote controller 10 repeatedly executes the processing of making the status inquiry to the host device 20 after allowing the communication unit 13 to be in the dormant state for the given time interval.

When there is transmission information, namely, when there is information transmission triggered by the host device 20 side ("Yes" in Step S1006), the remote controller 10 activates a function on the remote controller 10 side corresponding to the trigger (the microphone, the IC card reader 15 and so on) (Step S1008). Then, the remote controller 10 executes the activated function (Step S1009).

Figure 11:
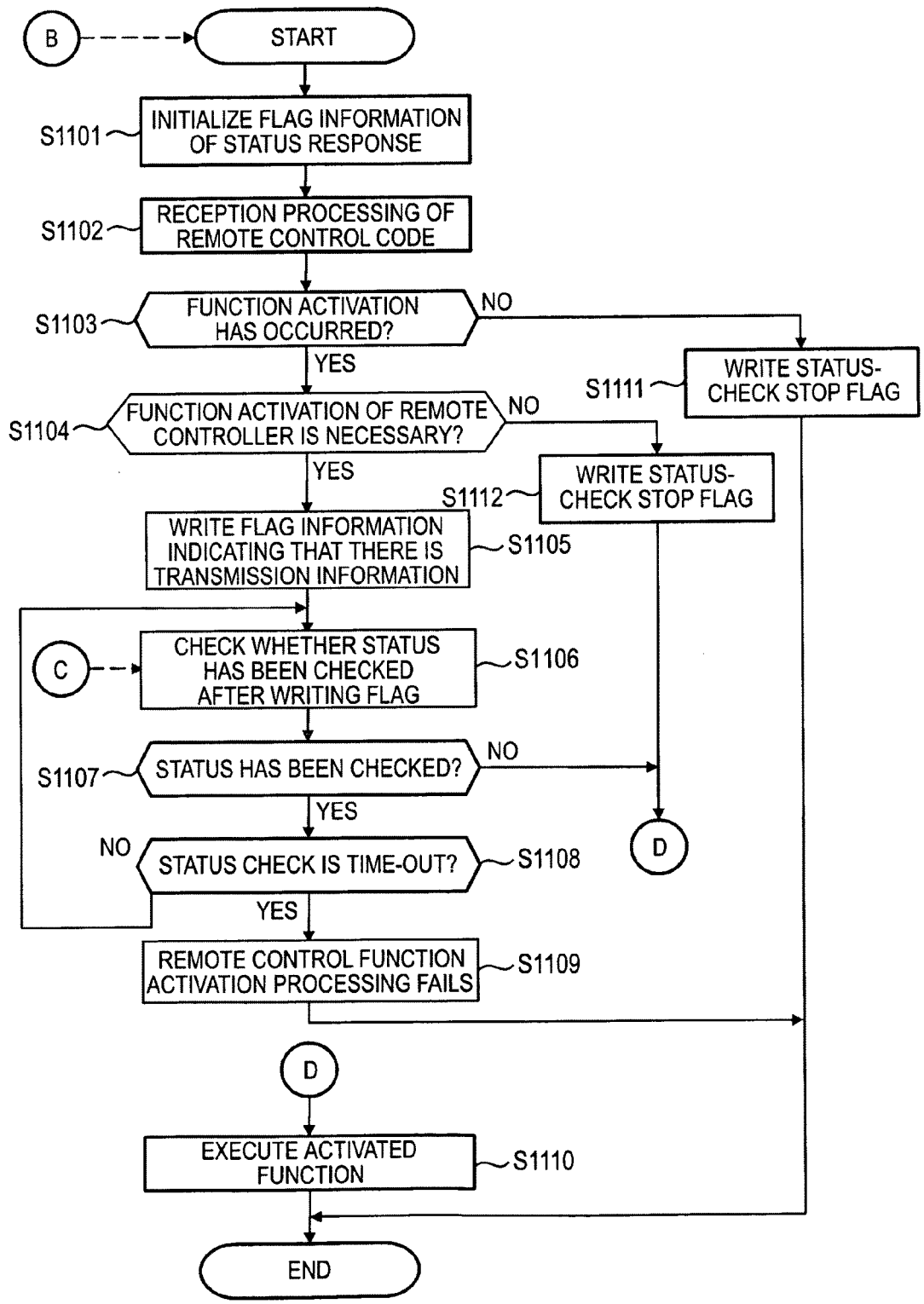
FIG. 11 is a flowchart showing processing procedures executed on the host device side.

FIG. 11 shows processing procedures executed on the host device 20 side for realizing the communication sequences shown in FIG. 2, FIG. 5, FIG. 6, FIG. 8 and FIG. 9 in a form of a flowchart. The processing procedures are activated in response to the reception of the remote control code at the communication unit 24 on the host device 20 side.

The host device 20 initializes information to be transmitted to the remote controller 10 side, namely, flag information of the status response (Step S1101). However, there may occur a case in which the process does not proceed well by initialization when some function is in process as well as when the function uses a function on the remote controller 10 side, and the initialization is performed in consideration of the circumstance.

Subsequently, the host device 20 performs processing of the remote control code received from the remote controller 10 (Step S1102). Then, the host device 20 checks any function has been activated or not by the remote control code (Step S1103).

For example, when the cursor button is pressed, the host device 20 side moves the selection display of the icon to up, down, left or right, and when the decision button is pressed, the selection of the function corresponding to the selected icon is fixed, and the host function unit 22 activates corresponding processing.

When the function is not activated on the host device 20 side by the received remote control code ("No" in Step S1103), the host device 20 creates a status response in which a status-check stop flag is written and transmits the response to the remote controller 10 (Step S1111) to end the processing routine.

When the function is activated on the host device 20 side by the received remote control code, the host device 20 subsequently checks whether activation of the function on the remote controller 10 side is necessary for the activated function or not (Step S1104).

When the activation of the function on the remote controller 10 side is not necessary ("No" in Step S1104), the host device 20 creates the status response in which the status-check stop flag is written and transmits the response to the remote controller 10 (Step S1112) to end the processing routine.

When receiving the status response in which the status-check stop flag is written, the remote controller 10 side can determine that it is not necessary to perform the status check after that, stopping repeated transmission of the status inquiry to be made with respect to the remote control code transmitted at this time.

On the other hand, when the activation of the function on the remote controller 10 side is necessary ("Yes" in Step S1104), the host device 20 creates the status response in which a trigger flag indicating that there is information transmission triggered by the host device 20 side with respect to the status inquiry from the remote controller 10 side is written, transmitting the status response to the remote controller 10 (Step S1105).

Then, the host device 20 check whether the status after the flag was written in Step S1105 has been checked by the remote controller 10 side or not (namely, whether the processing of Step S1004 in FIG. 10 has been executed) after transmitting the status response to the remote controller 10 (Step S1106). As the communication sequence shown in FIG. 13 (described above) is assumed to be performed here, the host device 20 can check the attainment of the status response by receiving the ACK from the remote controller 10. Conversely, when the ACK is not received within a fixed period of time after transmitting the status response ("No" in Step S1107), the process returns to Step S1106 and the retry of transmission of the status response is performed until the status check processing reaches time-out ("No" in Step S1108).

When the status check processing reaches time-out ("Yes" in Step S1108), the host device 20 executes processing performed when the activation of the function on the remote controller 10 side fails (Step S1109) to end the processing routine.

On the other hand, when the host device 20 can perform the status check processing until the time-out ("Yes" in Step S1107), the host device 20 executes the activated function (Step S1110).

Subsequently, a method of speeding up the response of the status inquiry by arranging status processing just close to the network layer both in the remote controller 10 and the host device 20 will be explained.

Figure 14:
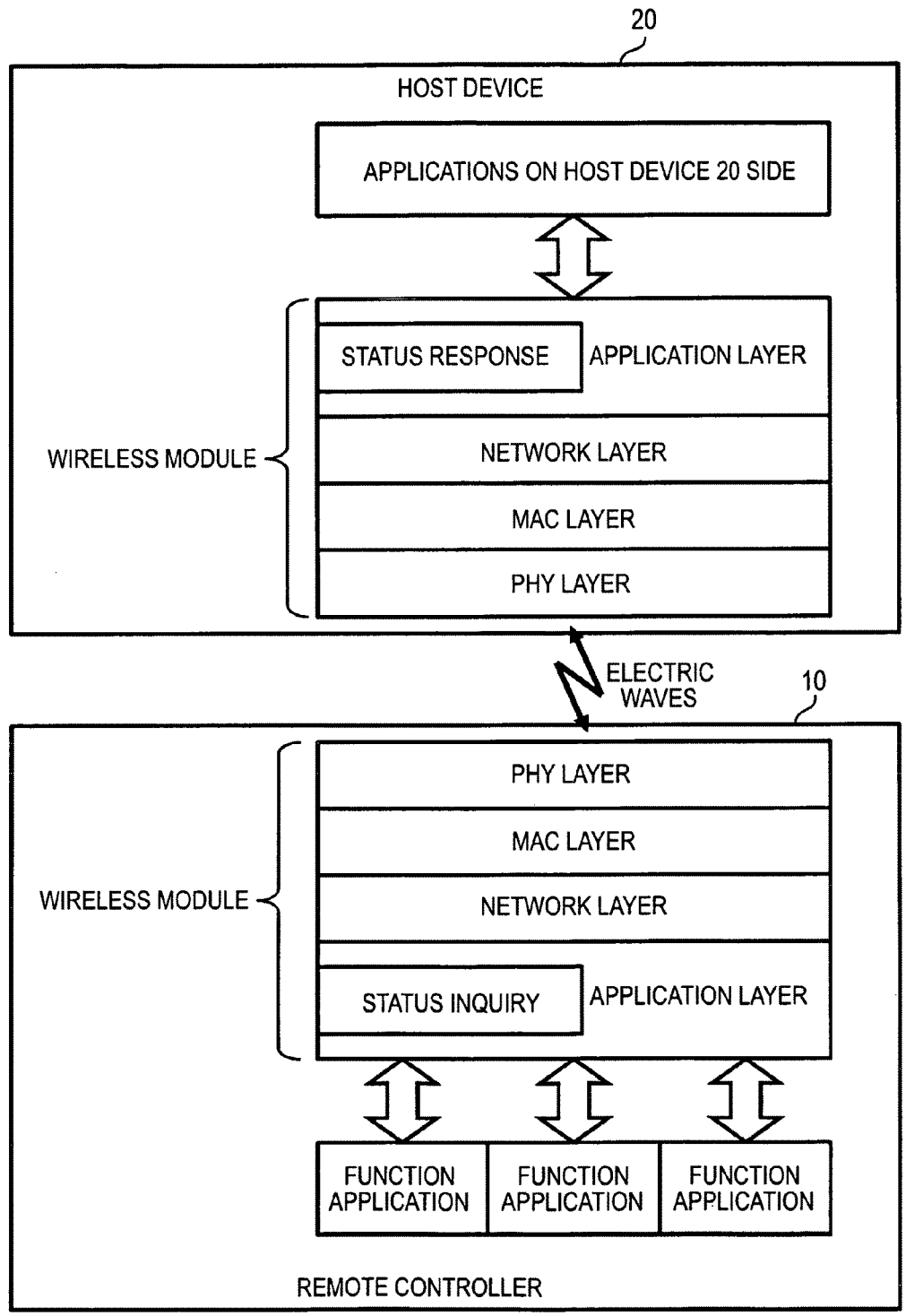
FIG. 14 is a diagram showing structures of protocol stacks on the remote control side and the host device side as examples.

FIG. 14 shows structures of protocol stacks on the remote control 10 side and the host device 20 side as examples.

On the remote controller 10 side, the function of "status inquiry" is arranged in the vicinity of the layer structure of wireless communication so as to be independent from the remote control function applications. On the host device 20 side, the function of "status response" is arranged in the vicinity of the layer structure of wireless communication so as to be independent from applications in the host function unit 22.

Both the remote control function applications and applications in the host function units 22 have a power-off state. When the processing of "status inquiry" is performed by the remote control function application and the processing of "status response" is performed by the application in the host function unit 22 which is different from FIG. 15, the operation of the status inquiry is not performed at all in the power-off state.

In response to the above, when the function of "status inquiry" is arranged in the vicinity of the layer structure of wireless communication so as to be independent from the remote control function applications as well as the function of "status response" is arranged in the vicinity of the layer structure of wireless communication so as to be independent from applications in the host function unit 22 as shown in FIG. 14, the remote controller 10 can maintain the dormant state in the remote control function applications though it is necessary to release the dormant state of the communication unit 13 at the time of inquiring the status, which suppresses power consumption to be low.

Figure 15:
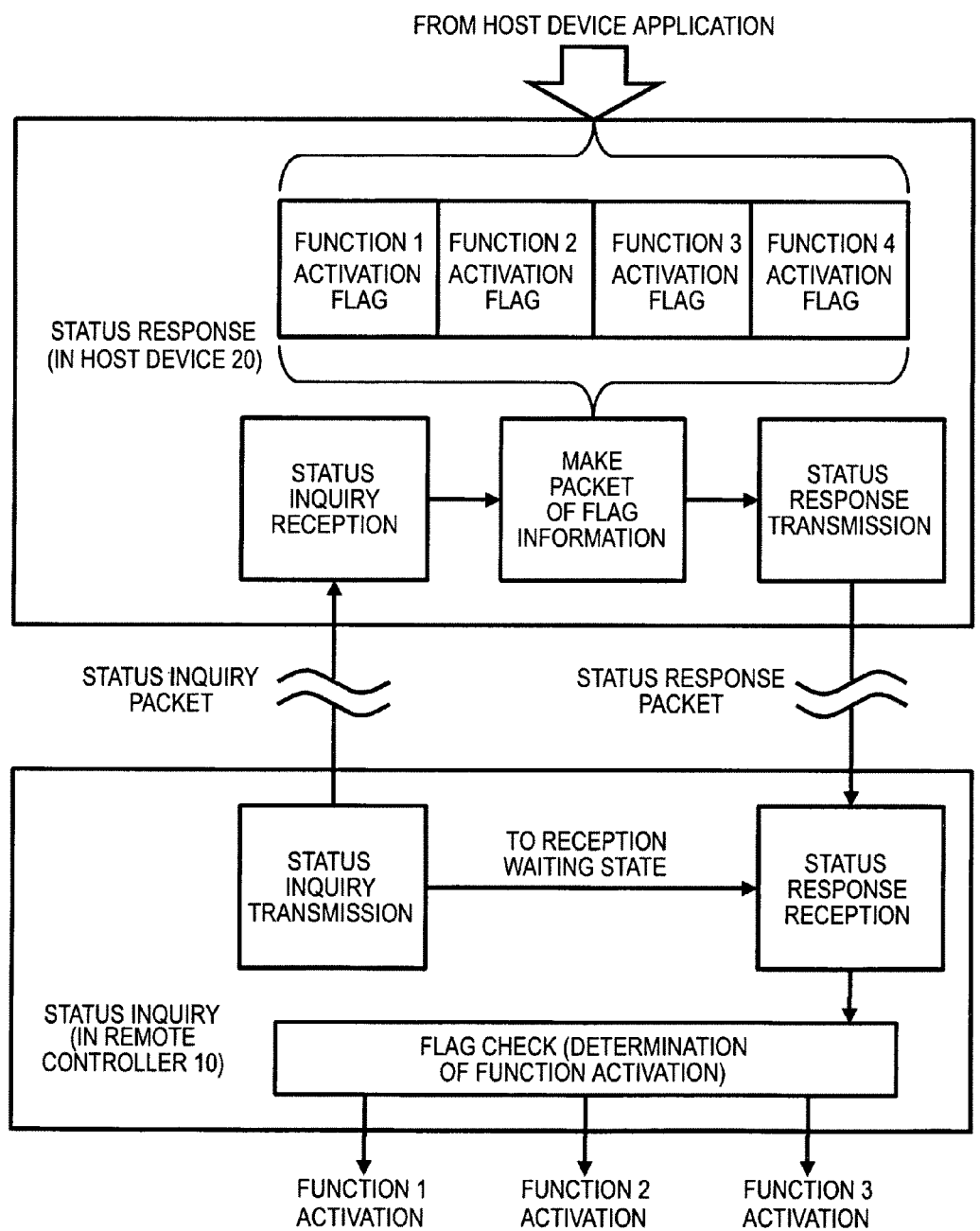
FIG. 15 is a diagram showing processing of "status inquiry" arranged in the vicinity of a layer structure of wireless communication on the remote controller side as well as "status response" arranged in the vicinity of the layer structure of wireless communication on the host device side.

FIG. 15 graphically shows processing of "status inquiry" arranged in the vicinity of the layer structure of wireless communication on the remote controller 10 side as well as processing of "status response" arranged in the vicinity of the layer structure of wireless communication on the host device 20 side.

"Status inquiry transmission" on the remote controller 10 side transmits an "inquiry packet" at the timing of inquiry and "status response reception" is in the reception waiting state.

On the host device 20 side, flag information is written in activation flags according to functions in plural flag memories located at "status response" arranged in applications in the host function unit 22. "Status inquiry reception" allows flag information written in the corresponding function activation flag to be a packet when receiving the inquiry packet, and "status response transmission" transmits the status response with respect to the status inquiry to the status inquiry source as the response packet.

When receiving the response packet, the remote controller 10 side checks flag information and activates the function corresponding to each kind of flag information written in the packet.

The host device 20 can include information other than activation flags of functions such as the microphone, the IC card reader 15 and the like included in the remote controller 10 in the response packet. Information which can be included in the response packet in addition to the activation flags is shown as follows.

(1) Flag Indicating an On/Off State of the Power on the Host Device 20 Side

Functions included in the remote controller 10 are basically used in a state in which the power on the host device 20 side as an operation target is ON. The remote controller 10 can determine that there is no probability of activating these functions when information indicating that the power of the host device 20 side is OFF can be obtained from the response packet. Therefore, the remote controller 10 can stop the communication unit 13 as the status inquiry is not necessary after that.

(2) Information Indicating States on the Host Device 20 Side Other than the Power State The host device 20 includes information indicating whether the device corresponds to respective functions included in the remote controller 10 in the response packet. The remote controller 10 side does not activate unnecessary functions.

(3) Information Indicating Operation States of Various Machine Types Connected to the Host Device 20 Side When various types of external apparatuses are connected to the host device 20, functions extended from the host device 20 itself can be provided. The host device 20 can includes information that the external apparatus is selected and information concerning the external apparatus to be connected in the response packet. The remote controller 10 can acquire such information to allow various functions to be operated so as to correspond to the external apparatus.

(4) Display Information Such as Characters

The remote controller 10 can include a display device such as a liquid crystal display though not shown in FIG. 1. The host device 20 can display information such as character strings provided on the host device 20 side in the remote controller 10 by including display information such as characters in the response packet. Naturally, display information other than character strings such as design data can be included in the response packet as long as information has the data size to fall within the size of the response packet.

(5) Flag Indicating that the Host Device 20 Transmits Information Following the Response Packet The host device 20 transmits the response packet with an active flag indicating additional information when there is additional information to be transmitted following the response packet. The remote controller 10 continues the reception waiting state in the communication unit 13 when receiving the response packet in which the flag is set to be active. The host device 20 can transmit large information to the remote controller 10 by transmitting the subsequent packet.

(6) Instruction for Requesting the Remote Controller 10 to Transmit Information The host device 20 includes an instruction for requesting the state information in the response packet when the state on the remote controller 10 side is necessary. The remote controller 10 transmits the requested information to the host device 20 when receiving the response packet including the instruction.

In the example shown in FIG. 15, information to be included in the response packet is the flag, however, it is not limited to the flag but information which can be interpreted or used on the remote controller side may be used. Also in the example shown in FIG. 15, information included in the response packet is information of activating various functions of the remote controller 10, however, information of controlling operations of the remote controller 10 can be included. It is also possible to include parameters used in respective functions on the remote controller 10 side in the response packet. Moreover, information of designating continuation or interruption of the status inquiry, the time interval of inquiries and so on from the remote controller 10 side can be included in the response packet.

Subsequently, a format of flag information included in the response packet with respect to the status inquiry will be explained.

In wireless networks such as IEEE802.15.4, the information amount to be transmitted in one packet is approximately 100 bytes. There is constraint on the mounting that it is difficult to increase the memory size for flag information to be mounted on a wireless module on the host device 20 side, and it is difficult to prepare the number of flags corresponding to functions included in the remote controller 10 side. The present inventors propose a method of transmitting flag information with a small data size by using a format including numbers of information and data corresponding to the numbers.

In the communication system 1 (that is, between the remote controller 10 and the host device 20), functions corresponding to numbers of information are defined in advance. The example of definitions is shown in the following chart.

| Numbers of information | Meanings of information | meanings of data |
|---|---|---|
| 1 | Activation flag of function 1 | =activated by "1" |
| 2 | Activation flag of function 2 | =activated by "1" |
| 3 | Activation flag of function 3 | =activated by "1" |
| 4 | Power supply of host device | =turned off by "0" |
| 5 | Additional information | =information exists by "1" |
| 6 | Stop status check | =stop by "1" |
| ... | ... | ... |

Figure 16:
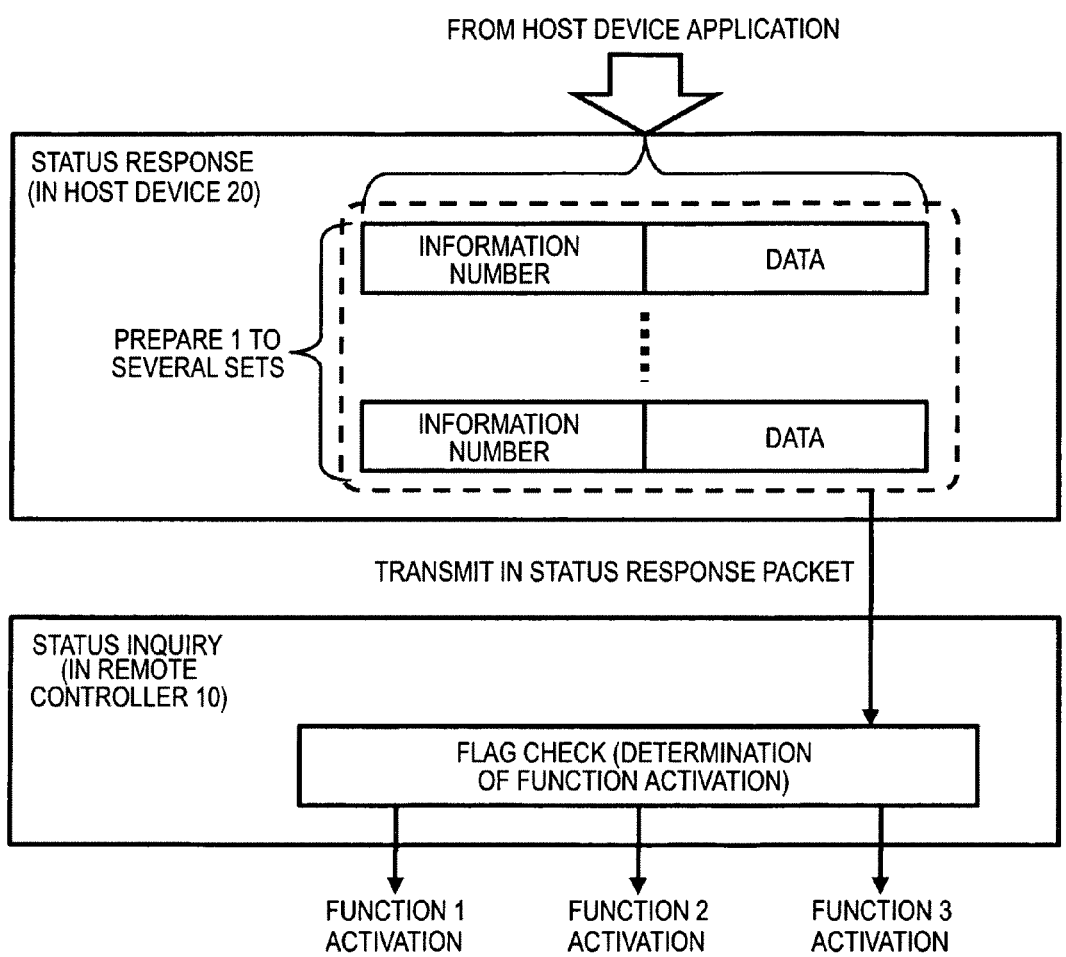
FIG. 16 is a diagram showing a scheme of transmitting flag information between the host device and the remote controller in a format of numbers of information+data.

As shown in the above chart, functions with respect to the numbers of information are defined in the format of numbers of information+data. The host device 20 writes only the number of information and data to be transmitted to the remote controller 10 in the response packet. The remote controller 10 side can determine which function's activation or stop has been designated by analyzing the number of information+ data written in the response packet (refer to FIG. 16). Therefore, the size of the response packet and the memory size for flag information mounted on the wireless module on the host device 20 side can be reduced.

The invention has been explained in detail with reference to the specific embodiment as the above. However, it is obvious that those skilled in the art can perform modification or substitution of the embodiment within a scope not departing from the gist of the invention.

In the specification, the embodiment in which the invention is applied to the remote control system including the remote controller and the host device to be an operation target of the remote control has been chiefly explained, however, the gist of the invention is not limited to the above embodiment. The invention can be similarly applied to various communication systems performing bidirectional communication.

In short, the invention has been disclosed in a form of exemplification, and the description of the specification should not be interpreted in a limited manner. In order to determine the gist of the invention, claims should be taken into consideration.

The present application contains subject matter related to that disclosed in Japanese Priority Patent Application JP 2010-095400 filed in the Japan Patent Office on Apr. 16, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system comprising:
a remote controller having an input unit to input user operations and a communication unit to perform bidirectional communication, to transmit a remote control code in accordance with the user operation with respect to the input unit from the communication unit; and
a host device having a communication unit to perform bidirectional communication and a host function unit to execute processing corresponding to the remote control code received in the communication unit,
the host device being configured to transmit a status response from the communication unit in response to a status inquiry transmitted from the communication unit of the remote controller,
the remote controller being configured to repeatedly execute a status check communication procedure in an automatic manner, in which the status check communication procedure includes the transmission of the status inquiry and waiting for receiving the status response after transmitting the remote control code at given time intervals during which the communication unit of the remote controller is in a dormant I state,
the remote controller being configured to execute an operation when receiving the status response not including transmission information, and
the remote controller being further configured to extend a time interval between the transmission of status inquiries according to a number of times of transmitting the status inquiries such that as the number of times increases, the time interval between the transmission of inquiries increases.

2. The communication system according to claim 1,
wherein the host device is configured to execute processing corresponding to the received remote control code and transmit the status response including transmission information with respect to the remote controller, and
the remote controller is configured to repeatedly execute the status check communication procedure until receiving the status response including transmission information.

3. The communication system according to claim 1,
wherein the host device is configured to execute processing corresponding to the received remote control code and transmit the status response including information indicating whether there is transmission information with respect to the remote controller or not, and
the remote controller is configured to repeatedly execute the status check communication procedure until receiving transmission information indicated by the status response.

4. The communication system according to claim 2,
wherein the remote controller includes one or more function units, the host device is configured to transmit transmission information instructing activation of at least one function unit in the one or more function units, and the remote controller is configured to activate the function unit designated by the received transmission information.

5. A communication device comprising:
an input unit to input user operations;
a communication unit to perform bidirectional communication; and
a control unit to control operations of the device,
an operation target device having a communication unit to perform bidirectional communication and a target function unit to execute processing corresponding to the remote control code received in the communication unit,
the target device being configured to transmit a status response from the communication unit in response to a status inquiry transmitted from the communication unit of the remote controller,
the control unit is configured to allow the communication unit to transmit a remote control code with respect to the operation target device in accordance with the user operation to the input unit and repeatedly execute a status check communication procedure in an automatic manner, in which the status check communication procedure includes transmission of a status inquiry and waiting for receiving a status response from the operation target device after transmitting the remote control code at given time intervals during which the communication unit is in a dormant state, the control unit is configured to execute an operation when receiving the status response not including transmission information, and the control unit being further configured to extend a time interval between the transmission of status inquiries according to a number of times of transmitting the status inquiries such that as the number of times increases, the time interval between the transmission of inquiries increases.

6. The communication device according to claim 5, wherein the control unit is configured to repeatedly execute the status check communication procedure until receiving the status response including transmission information from the operation target device.

7. The communication device according to claim 5, wherein the control unit is configured to repeatedly execute the status check communication procedure until receiving transmission information when receiving the status response including information indicating whether there is transmission information or not from the operation target device.

8. The communication device according to claim 6, further comprising; one or more function units, wherein the control unit is configured to activate the function unit designated by transmission information received from the operation target device.

* * * * *